United States Patent
Nammi et al.

(10) Patent No.: US 10,594,433 B2
(45) Date of Patent: Mar. 17, 2020

(54) SENDING A CONFIGURATION MESSAGE AND REPORTING CHANNEL INFORMATION ON PUCCH IN PCELL AND IN SCELL

(71) Applicant: Telefonaktiebolaget LM Ericsson (publ), Stockholm (SE)

(72) Inventors: Sairamesh Nammi, Austin, TX (US); Dominque Everaere, Åkersberga (SE); Christian Hoymann, Aachen (DE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 15/579,511

(22) PCT Filed: Jun. 3, 2016

(86) PCT No.: PCT/SE2016/050529
§ 371 (c)(1),
(2) Date: Dec. 4, 2017

(87) PCT Pub. No.: WO2016/195583
PCT Pub. Date: Dec. 8, 2016

(65) Prior Publication Data
US 2018/0109352 A1  Apr. 19, 2018

Related U.S. Application Data

(60) Provisional application No. 62/171,334, filed on Jun. 5, 2015, provisional application No. 62/171,295, filed on Jun. 5, 2015.

(51) Int. Cl.
  H04W 4/00      (2018.01)
  H04L 1/00      (2006.01)
(Continued)

(52) U.S. Cl.
  CPC ........ H04L 1/0026 (2013.01); H04L 1/0027 (2013.01); H04L 5/006 (2013.01);
(Continued)

(58) Field of Classification Search
  CPC ... H04L 1/0026; H04L 1/0027; H04L 5/0057; H04L 5/006; H04L 5/0091; H04W 72/048
(Continued)

(56) References Cited

U.S. PATENT DOCUMENTS

2012/0287799 A1* 11/2012 Chen .................... H04B 7/024
                                                        370/252
2013/0010634 A1*  1/2013 Lim .................... H04W 72/085
                                                        370/252
(Continued)

FOREIGN PATENT DOCUMENTS

EP   2785128 A1   10/2014
EP   2833686 A1    2/2015
(Continued)

OTHER PUBLICATIONS

3GPP, "3rd Generation Partnership Project; Technical Specification Group Radio Access Network; Evolved Universal Terrestrial Radio Access (E-UTRA); Feasibility study on possible additional configuration for LTE Time Division Duplex (TDD) (Release 13)", 3GPP TR 36.825 V13.0.0, Sep. 2015, 1-35.
(Continued)

*Primary Examiner* — Thai D Hoang
(74) *Attorney, Agent, or Firm* — Sage Patent Group

(57) ABSTRACT

Method performed by a first communication device (101) for sending a configuration message to a second communication device (102). The first communication device (101) and the second communication device (102) operate in a communications network (100). The first communication device (101) sends (502) the configuration message to the
(Continued)

second communication device (102). The configuration message is for configuring the second communication device (102) to report channel information about one carrier (143) to the first communication device (101) on a primary carrier (141) and on one or more secondary carriers (142). According to a method performed by the second communication device (102), the second communication device (102) receives (601) the configuration message and sends (604) a first channel information report on the primary carrier (141) and a second channel information report on a first secondary carrier of the one or more secondary carriers (142), according to the received configuration message.

16 Claims, 16 Drawing Sheets

(51) Int. Cl.
  *H04L 5/00* (2006.01)
  *H04W 72/04* (2009.01)
  *H04L 1/18* (2006.01)
  *H04L 5/14* (2006.01)

(52) U.S. Cl.
  CPC .......... *H04L 5/0057* (2013.01); *H04L 5/0091* (2013.01); *H04W 72/0413* (2013.01); *H04L 1/1822* (2013.01); *H04L 1/1825* (2013.01); *H04L 1/1861* (2013.01); *H04L 5/001* (2013.01); *H04L 5/0053* (2013.01); *H04L 5/1469* (2013.01)

(58) Field of Classification Search
  USPC ........ 370/329–330, 335–338, 341, 342–345, 370/348–348
  See application file for complete search history.

(56) References Cited

U.S. PATENT DOCUMENTS

| | | | |
|---|---|---|---|
| 2013/0267222 A1* | 10/2013 | Park | H04B 7/0619 455/422.1 |
| 2014/0177744 A1* | 6/2014 | Krishnamurthy | H04B 7/0469 375/267 |
| 2014/0177745 A1* | 6/2014 | Krishnamurthy | H04B 7/0413 375/267 |
| 2014/0226609 A1* | 8/2014 | Hooli | H04W 16/14 370/329 |
| 2014/0307644 A1* | 10/2014 | Kwong | H04L 5/0005 370/329 |
| 2015/0085782 A1 | 3/2015 | Seo et al. | |
| 2015/0124665 A1 | 5/2015 | Park | |
| 2015/0359000 A1* | 12/2015 | Li | H04W 74/06 370/329 |
| 2018/0109352 A1* | 4/2018 | Nammi | H04L 1/0027 |

FOREIGN PATENT DOCUMENTS

| | | |
|---|---|---|
| EP | 2835918 A1 | 2/2015 |
| WO | 2013177780 A1 | 12/2013 |

OTHER PUBLICATIONS

Unknown, Author, "Configuration of PUCCH SCell", R2-152520, 3rd Generation Partnership Project (3GPP), vol. RAN WG2, no. Fukuoka, Japan, May 24, 2015, 1-2.

Unknown, Author, "PUCCH on SCell", R2-150389, 3rd Generation Partnership Project (3GPP), vol. RAN WG2, no. Athens, Greece; Feb. 9, 2015-Feb. 13, 2015, Feb. 8, 2015, 1-8.

Unknown, Author, "PUCCH on SCell for CA enhancement beyond 5CCs", R2150290, 3rd Generation Partnership Project (3GPP), vol. RAN WG2, no. Athens, Greece; Feb. 9, 2015-Feb. 13, 2015, Feb. 8, 2015, 1-8.

Unknown, Author, "SR on PUCCH SCell", R2-151488, 3rd Generation Partnership Project (3GPP), vol. RAN WG2, no. Bratislava, Slovakia; Apr. 20, 2015-Apr. 24, 2015, Apr. 19, 2015, 1-8.

Unknown, Author, "SR support on PUCCH on SCell", R2-151287, 3rd Generation Partnership Project (3GPP), vol. RAN WG2, no. Bratislava, Slovakia; Apr. 20, 2015-Apr. 24, 2015, Apr. 19, 2015, 1-8.

Unknown, Author, "Considerations of introducing possible additional TDD configuration(s)", NEC, 3GPP TSG RAN Meeting #67, RP-150140, Shanghai, China, Mar. 9-12, 2015, 1-5.

* cited by examiner

SENDING A CONFIGURATION MESSAGE AND REPORTING CHANNEL INFORMATION ON PUCCH IN PCELL AND IN SCELL

TECHNICAL FIELD

The present disclosure relates generally to a first communication device and methods performed thereby for sending a configuration message to a second communication device. The present disclosure also relates generally to a second communication device and methods performed thereby for reporting channel information to a first communication device. The present disclosure further relates generally to a computer program product, comprising instructions to carry out the actions described herein, as performed by the first communication device, or by the second communication device. The computer program product may be stored on a computer-readable storage medium.

BACKGROUND

Communication devices such as wireless devices are also known as e.g. User Equipments (UE), mobile terminals, wireless terminals and/or Mobile Stations (MS). Wireless devices are enabled to communicate wirelessly in a cellular communications network or wireless communication network, sometimes also referred to as a cellular radio system, cellular system, or cellular network. The communication may be performed e.g. between two wireless devices, between a wireless device and a regular telephone and/or between a wireless device and a server via a Radio Access Network (RAN) and possibly one or more core networks, comprised within the wireless communications network.

Wireless devices may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The wireless communications network covers a geographical area which may be divided into cell areas, wherein each cell area being served by an access node such as a Base Station (BS), e.g. a Radio Base Station (RBS), which sometimes may be referred to as e.g. Evolved Node B "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

3GPP LTE

3rd Generation Partnership Project (3GPP) Long-Term Evolution (LTE) represents a project within the third generation partnership project, with an aim to improve the Universal Mobile Telecommunications System (UMTS) standard. The 3GPP LTE radio interface offers high peak data rates, low delays and an increase in spectral efficiencies. The LTE physical layer is designed to achieve higher data rates, and is facilitated by turbo coding/decoding, and higher order modulations, up to 256-Quadrature Amplitude Modulation (QAM). The modulation and coding may be adaptive, and may depend on channel conditions. Orthogonal Frequency Division Multiple Access (OFDMA) may be used for the downlink, while Single Carrier Frequency Division Multiple Access (SC-FDMA) may be used for the uplink. The main advantage of such schemes is that the channel response is flat over a sub-carrier even though the multi-path environment may be frequency selective over the entire bandwidth. This may reduce the complexity involved in equalization, as simple single tap frequency domain equalizers, which may be understood as stateless or memoryless filters, may be used at the receiver. OFDMA allows LTE to achieve its goal of higher data rates, reduced latency and improved capacity/coverage, with reduced costs to the operator. The LTE physical layer supports Hybrid Automatic Repeat reQuest (H-ARQ), power weighting of physical resources, uplink power control, and Multiple-Input Multiple-Output (MIMO).

Duplex Schemes

The LTE ecosystem may support both Frequency Division Duplex (FDD) and Time Division Duplex (TDD). This may enable the operators to exploit both the paired and unpaired spectrum, since LTE may have flexibility in bandwidth, as it may support 6 bandwidths 1.4 MegaHertz (MHz), 3 MHz, 5 MHz, 10 MHz, 15 MHz and 20 MHz.

Frequency Division Duplex

In the case of FDD operation, there may be two carrier frequencies which are represented in FIG. 1, one for uplink transmission ($f_{uplink}$) and one for downlink transmission ($f_{downlink}$). During each frame, 10 Transmission Time Intervals (TTI) or subframes, there may thus be ten uplink subframes and ten downlink subframes, each represented in FIG. 1 as a box, and uplink and downlink transmission may occur simultaneously within a cell. Isolation between downlink and uplink transmissions may be achieved by transmission/reception filters, known as duplex filters, and a sufficiently large duplex separation in the frequency domain.

Time Division Duplex

In the case of TDD operation, there is a single carrier frequency only and uplink and downlink transmissions are separated in the time domain on a cell basis. For example, FIG. 2 shows an example of a TDD frame where some subframes, each represented in FIG. 2 as a box, are allocated for uplink transmissions and some subframes for downlink transmission, with the switch between downlink and uplink occurring in the special subframe denoted as S. Different asymmetries in terms of the amount of resource that is, subframes allocated for uplink and downlink transmission respectively may be provided through the seven different downlink/uplink configurations as shown in Table 1.

TABLE 1

TDD configurations supported in LTE

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Message Sequence Chart of Downlink Transmission

FIG. 3 shows an example of a typical message sequence chart for downlink data transfer in LTE. From the pilot or reference signals received from an eNB at 301, a UE may then at 302 compute the channel estimates, then compute the parameters that may be needed for Channel State Information (CSI) reporting. The CSI report may consist of, for example, channel quality information (CQI), a Precoding Matrix Index (PMI), a Rank Information (RI) etc. At 303, the CSI report is sent to the eNodeB via a feedback channel either Physical Uplink Control Channel (PUCCH), periodic CSI reporting, or Physical Uplink Shared Channel (PUSCH), aperiodic. At 304, the eNodeB scheduler may use this information in choosing the parameters for scheduling of this particular UE. At 305, the eNodeB sends the scheduling parameters to the UE in the downlink control channel called Physical Downlink Control CHannel (PDCCH). However, before sending the PDCCH, the eNode B sends control format indicator information on the Physical Control Format Indicator CHannel (PCFICH), which is a physical channel providing the UEs with information necessary to decode the set of downlink control channels (PDCCH). After that, actual data transfer takes place from eNodeB to the UE at 306, via the Physical Downlink Shared Channel (PDSCH).

Uplink Control Channel

In LTE, the uplink control channel may carry information about Hybrid Automatic Repeat reQuest (HARQ)-ACKnowledgment (ACK) information corresponding to the downlink data transmission, and channel state information. The channel state information may typically consist of a Rank Indicator (RI), CQI, and a PMI. Either the PUCCH or the PUSCH may be used to carry this information. The PUCCH reporting may be periodic, and the periodicity of the PUCCH may be configured by the higher layers, while the PUSCH reporting may be aperiodic. Also, there may be various modes for PUCCH and PUSCH, and, in general, the reporting may depend on the transmission mode, and the formats may be configured via higher layer signaling.

Downlink Control Channel

In LTE, the downlink control channel (PDCCH) may carry information about the scheduling grants. Typically, this may consist of a number of M IMO layers scheduled, transport block sizes, modulation for each codeword, parameters related to HARQ, sub band locations and also PMI corresponding to those sub bands.

Typically, the following information may be transmitted by means of the downlink control information (DCI) format: localized/distributed Virtual Resource Block (VRB) assignment flag, resource block assignment, modulation and coding scheme, HARQ process number, new data indicator, redundancy version, Transmitter Power Control (TPC) command for PUCCH, downlink assignment index, precoding matrix index, and number of layers.

Note that, all DCI formats may not use all the information as shown above. In general, the contents of PDCCH may depend on transmission mode and DCI format.

Carrier Aggregation in LTE

Carrier aggregation (CA) was introduced in Release 10 for LTE and/or LTE Advanced (LTE-A) to increase the bandwidth without any modifications of the baseband. In the case of carrier aggregation, multiple LTE carriers, each with a bandwidth up to 20 MHz may be transmitted in parallel to and/or from the same terminal, thereby allowing for an overall wider bandwidth, and correspondingly higher per-link data rates. In the context of carrier aggregation, each carrier may be referred to as a component carrier as, from a Radio Frequency (RF) point-of-view, the entire set of aggregated carriers may be seen as a single, RF, carrier. Till Release 12, up to 5 LTE/LTE-A component carriers may be aggregated, allowing for transmission bandwidths up to 40 MHz for High-Speed Packet Access (HSPA), and up to 100 MHz for LTE/LTE-A.

A terminal capable of carrier aggregation may receive or transmit simultaneously on multiple component carriers. Aggregated component carriers may not need to be contiguous in the frequency domain. Rather, with respect to the frequency location of the different component carriers, three different cases may be identified: intra-band aggregation with frequency-contiguous component carriers, intra-band aggregation with non-contiguous component carriers, and inter-band aggregation with non-contiguous component carriers.

A terminal capable of carrier aggregation may have one downlink primary component carrier and an associated uplink primary component carrier. In addition, it may have one or several secondary component carriers in each direction. Different terminals may have different carriers as their primary component carrier—that is, the configuration of the primary component carrier may be terminal specific.

Additional TDD Configurations in LTE

From the recent mobile data statistics, in general the traffic is asymmetric. This means that DL traffic may be much heavier than uplink. Hence, in order to support more downlink subframes for LTE-TDD systems, a 3GPP RAN plenary has discussed adding more downlink heavy configurations for the currently existing TDD configurations. The configurations under considerations are 10:0:0 and 9:1:0. Both the configurations are configured along with a standalone carrier as the primary carrier.

Downlink heavy configurations, however, with existing methods, negatively affect the performance of wireless devices, e.g., due to reduced throughput, and result in degraded network communications.

SUMMARY

It is therefore an object of embodiments herein to improve the performance of a communications network by providing improved methods of sending a configuration message.

According to a first aspect of embodiments herein, the object is achieved by a method performed by a first communication device. The method is for sending a configuration message to a second communication device. The first communication device and the second communication device operate in a communications network. The first communication device sends the configuration message to the second communication device. The configuration message is for configuring the second communication device to report channel information about one carrier to the first communication device. The configuration message is for configuring the second communication device to report the channel information on a primary carrier and on one or more secondary carriers.

According to a second aspect of embodiments herein, the object is achieved by a method performed by the second communication device. The method is for reporting the channel information to the first communication device. The first communication device and the second communication device operate in the communications network. The second communication device receives the configuration message from the first communication device. The configuration message is for configuring the second communication device to report the channel information about the one carrier to the first communication device. The configuration message is for configuring the second communication device to report the channel information on the primary carrier and on the one or more secondary carriers. The second communication device sends a first channel information report to the first communication device for the one carrier on the primary carrier, according to the received configuration message. The second communication device also sends a second channel information report to the first communication device for the one carrier on a first secondary carrier of the one or more secondary carriers, according to the received configuration message.

According to a third aspect of embodiments herein, the object is achieved by the first communication device configured to send the configuration message to the second communication device. The first communication device and the second communication device are configured to operate in the communications network. The first communication device is configured to send the configuration message to the second communication device. The configuration message is configured to configure the second communication device to report channel information about the one carrier to the first communication device. The configuration message is also configured to configure the second communication device to report the channel information on the primary carrier and on the one or more secondary carriers.

According to a fourth aspect of embodiments herein, the object is achieved by the second communication device configured to report the channel information to the first communication device. The first communication device and the second communication device are configured to operate in the communications network. The second communication device is configured to receive the configuration message from the first communication device. The configuration message is configured to configure the second communication device to report channel information about the one carrier to the first communication device. The configuration message is configured to further configure the second communication device to report the channel information on the primary carrier and on the one or more secondary carriers. The second communication device is further configured to send the first channel information report to the first communication device for the one carrier on the primary carrier, according to the received configuration message. The second communication device is also configured to send the second channel information report to the first communication device for the one carrier on the first secondary carrier of the one or more secondary carriers, according to the received configuration message.

According to a fifth aspect of embodiments herein, the object is achieved by a computer program. The computer program comprises instructions which, when executed on at least one processor, cause the at least one processor to carry out the method performed by the first communication device.

According to a sixth aspect of embodiments herein, the object is achieved by computer-readable storage medium. The computer-readable storage medium has stored thereon a computer program comprising instructions which, when executed on at least one processor, cause the at least one processor to carry out the method performed by the first communication device.

According to a seventh aspect of embodiments herein, the object is achieved by a computer program. The computer program comprises instructions which, when executed on at least one processor, cause the at least one processor to carry out the method performed by the second communication device.

According to an eighth aspect of embodiments herein, the object is achieved by computer-readable storage medium. The computer-readable storage medium has stored thereon a computer program comprising instructions which, when executed on at least one processor, cause the at least one processor to carry out the method performed by the second communication device.

By the first communication device sending the configuration message to the second communication device, and thereby configuring the second communication device to report channel information about the one carrier on the primary carrier and on the one or more secondary carriers, the load on the primary carrier, e.g., in the PUCCH, is reduced. As a result, more wireless devices may be accommodated to transmit their respective channel information on the primary carrier. Furthermore, the first communication device may also receive more frequent feedback on the one carrier, thereby improving the downlink throughout.

BRIEF DESCRIPTION OF THE DRAWINGS

Examples of embodiments herein are described in more detail with reference to the accompanying drawings, on which.

DETAILED DESCRIPTION

Terminologies

Figure 1:
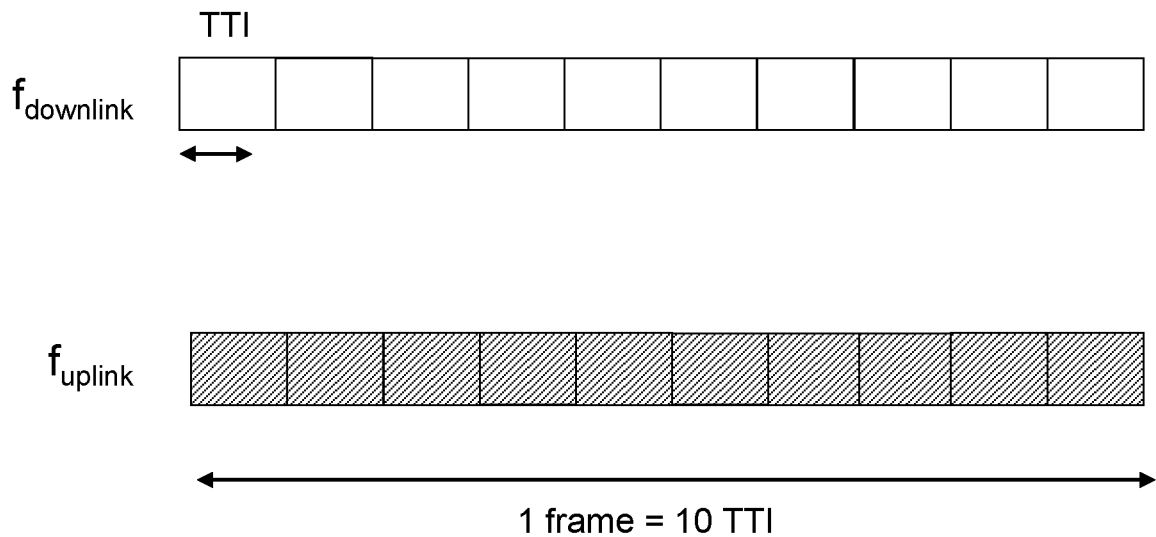
FIG. 1 is a schematic diagram illustrating an FDD time-frequency structure.
Figure 2:
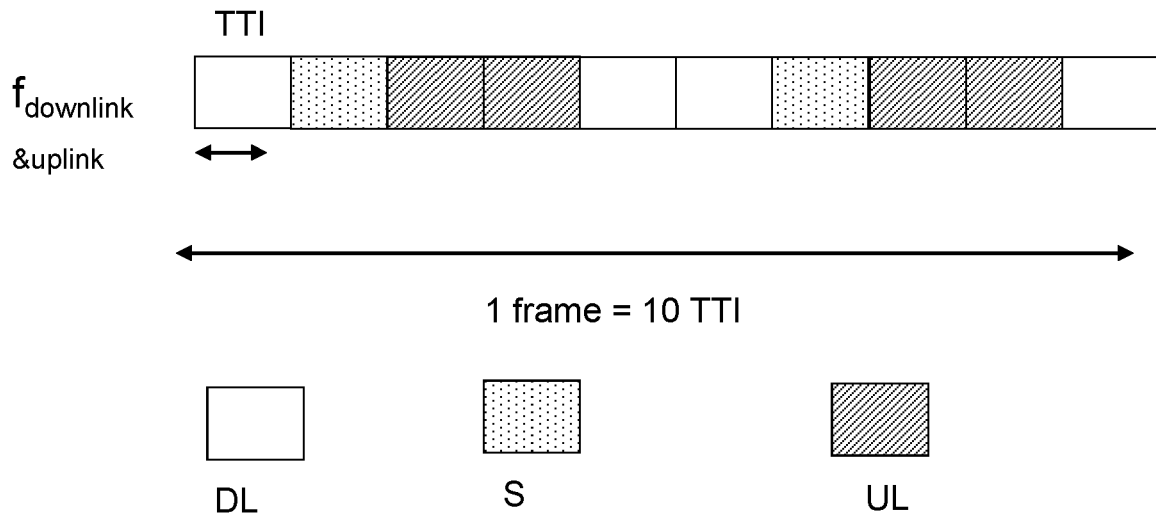
FIG. 2 is a schematic diagram illustrating a TDD time-frequency structure.
Figure 3:
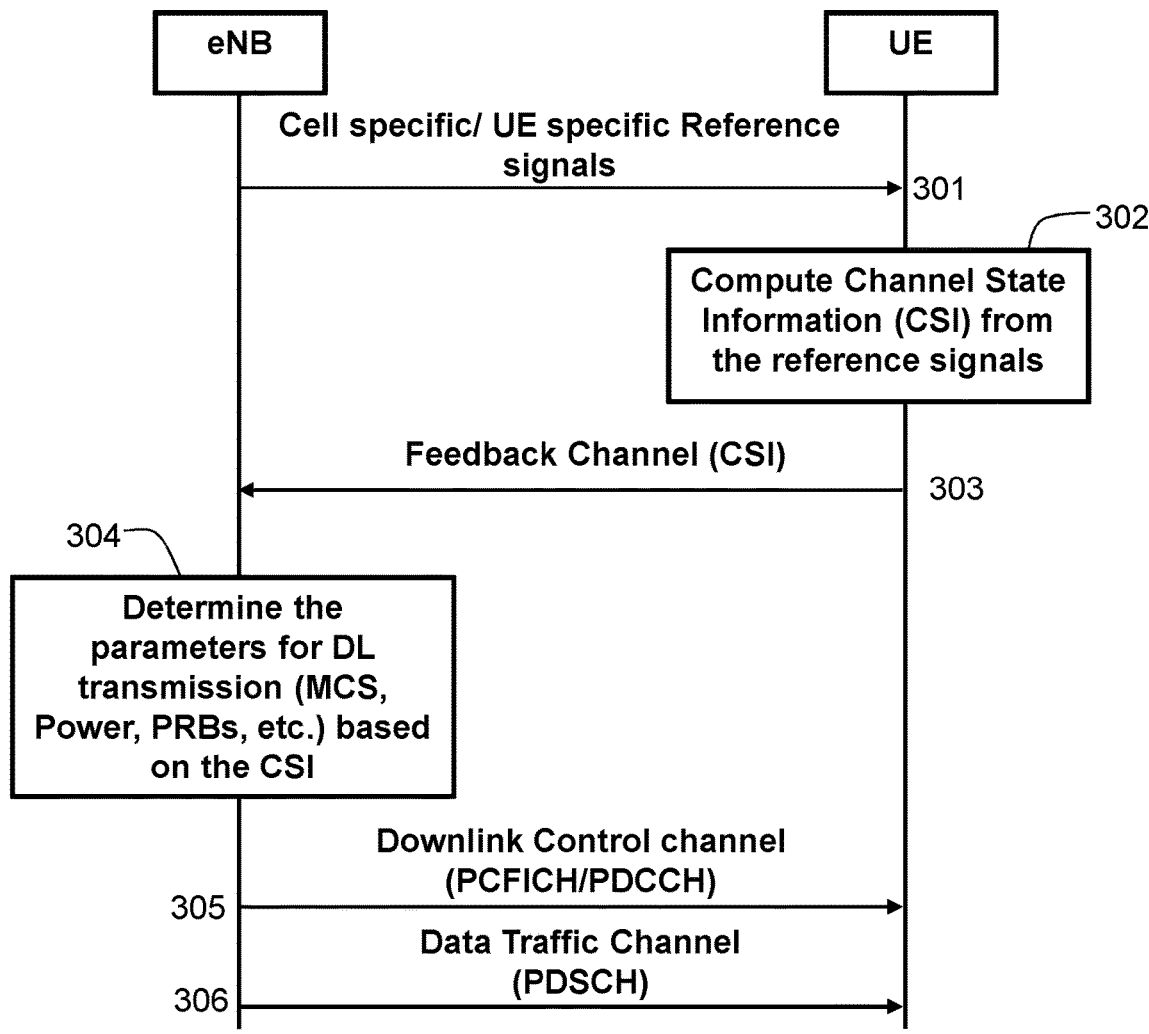
FIG. 3 is a schematic diagram illustrating a message sequence chart between an eNode B and a UE.

The following commonly terminologies are used in the embodiments and are elaborated below:

Radio network node: In some embodiments the non-limiting term radio network node is more commonly used and it refers to any type of network node serving a wireless device and/or connected to other network node or network element or any radio node from where a wireless device receives a signal. Examples of radio network nodes are Base Transceiver Station (BTS), Node B, Base Station (BS), Multi-Standard Radio (MSR) radio node such as MSR BS, eNode B, network controller, Radio Network Controller (RNC), base station controller, relay, donor node controlling relay, Access Point (AP), transmission points, transmission nodes, Remote Radio Unit (RRU), Remote Radio Head (RRH), nodes in Distributed Antenna System (DAS) etc.

Network node: In some embodiments, a more general term "network node" is used and it may correspond to any type of radio network node or any network node, which communicates with at least a radio network node. Examples of network node are any radio network node stated above, core network node, e.g., MSC, Mobility Management Entity (MME), etc, Operational and Maintenance (O&M), Operational Support Systems (OSS), Self Organizing Network (SON) node, positioning node, e.g. Evolved Serving Mobile Location Centre (E-SMLC), Minimization of Drive Test (MDT) node, etc.

Wireless device: In some embodiments the non-limiting term wireless device is used and it refers to any type of wireless device communicating with a radio network node in a cellular or mobile communication system. Examples of wireless device are target device, device to device mobile stations, machine type mobile stations or mobile stations capable of machine to machine communication, PDA, iPAD, Tablet, mobile terminals, smartphone, laptop embedded equipped (LEE), laptop mounted equipment (LME), USB dongles etc.

In some embodiments the non-limiting term user equipment (UE) is used. It refers to any type of wireless device that communicates with a radio network node in a cellular or mobile communication system. Examples of UE are target device, Device-to-Device (D2D) UE, machine type UE or UE capable of Machine-To-Machine (M2M) communication, PDA, iPAD, Tablet, mobile terminals, smart phone, laptop embedded equipped (LEE), laptop mounted equipment (LME), USB dongles etc.

The embodiments are applicable to single carrier as well as to MultiCarrier (MC) or Carrier Aggregation (CA) operation of the UE. The term carrier aggregation (CA) may be also called, e.g. interchangeably called, "multi-carrier system", "multi-cell operation", "multi-carrier operation", "multi-carrier" transmission and/or reception.

Although terminology from the 3rd Generation Partnership Project (3GPP) Radio Access Network (GERAN) has been used in this disclosure to exemplify the embodiments herein, this should not be seen as limiting the scope of the embodiments herein to only the aforementioned system. Other wireless systems, including Wideband Code Division Multiple Access (WCDMA), WiMax, and Ultra Mobile Broadband (UMB) may also benefit from exploiting the ideas covered within this disclosure.

In this section, the embodiments herein will be illustrated in more detail by a number of exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

As part of the development of embodiments herein, a problem will first be identified and discussed.

As explained in the section entitled "Additional TDD configurations in LTE", the additional LTE TDD configurations that are currently being planned to be added to support heavier downlink transmissions may be deployed as non-stand alone, that is, downlink only, or there may be a standalone carrier, that is, a carrier capable of carrying information in the uplink and in the downlink, accompanying the non-standalone carrier. The standalone carrier may be a primary carrier for the UE. It is well known that, when the UE is configured to have downlink transmission from more than one carrier, the uplink feedback information, i.e., channel state information as explained in the section entitled "Uplink Control Channel", may need to be transmitted on the standalone carrier. This implies that with the additional TDD configurations, the load on the PUCCH of the primary cell increases. And this in turn implies that the probability of accessing the PUCCH of the primary carrier decreases, as it is well known that PUCCH resources are shared among UEs. Hence, the performance of the legacy UEs which will be transmitting CSI on the primary carrier will be impacted with the additional TDD configurations, resulting with a reduction in throughput.

This problem is addressed in the present disclosure. The main motivation behind the proposed method is that the additional TDD configurations may in general be deployed in a low power node network on a secondary carrier. A typical deployment scenario may be considered as an example, where the primary carrier, which may operate on a first frequency (f1), is transmitted from the macro node, and a first secondary carrier, which may operate on a second frequency (f2) on the small cells within the macro cell using RRH deployment. The f1 and f2 may be deployed using FDD. The additional TDD configuration may be deployed in the small cell on another carrier frequency, or third carrier frequency, (f3). Hence, it may be possible to configure the UE with a minimum of 3 carriers. Ideally, for CSI reporting for the additional TDD configuration the UE may need to use PUCCH of the primary carrier (f1), if the third carrier is a downlink-only or non-standalone carrier. This will increase the load of the PUCCH of the primary carrier. However, embodiments herein may make it possible to reduce the loading of the primary carrier by transmitting alternatively the CSI reports on the two carriers f1 and f2. That is, the network may configure the UE with two reporting intervals, or one, for sending the reports, and the delta time interval between the two reports.

Hence, embodiments herein may relate to wireless communication systems, and in particular to methods related to configuring the channel state information reporting for downlink transmissions in time division duplex systems. More particularly, embodiments herein may relate to configuring an efficient channel state information reporting in a TDD wireless communication system, to mitigate the drawbacks of deploying additional TDD configuration. Embodiments herein may provide an efficient mechanism for configuring the UE for channel state information reporting on both the primary and secondary carriers at two different time intervals thereby reducing the load on the primary carrier. Embodiments herein may be generally related to the uplink control channel, TDD, FDD, carrier aggregation, downlink only, LTE, LTE-A, PUCCH, and PUSCH.

Embodiments herein are explained for CSI reporting for additional TDD configurations. However, the embodiments described may be applicable to any carrier either FDD or TDD when configured as the primary or secondary carrier.

In some embodiments CSI-Reference Signal (RS) is used for simplicity. However, embodiments may be applicable to any type of reference signal, a.k.a. pilot signals, or any known sequence or signals which may be transmitted in a radio resource from an antenna element belonging to any antenna system. The radio resource may be a resource element which in turn may be a time-frequency resource. The terms element, elements and antenna ports may be also interchangeably used but carry the same meaning in this disclosure.

Figure 4:
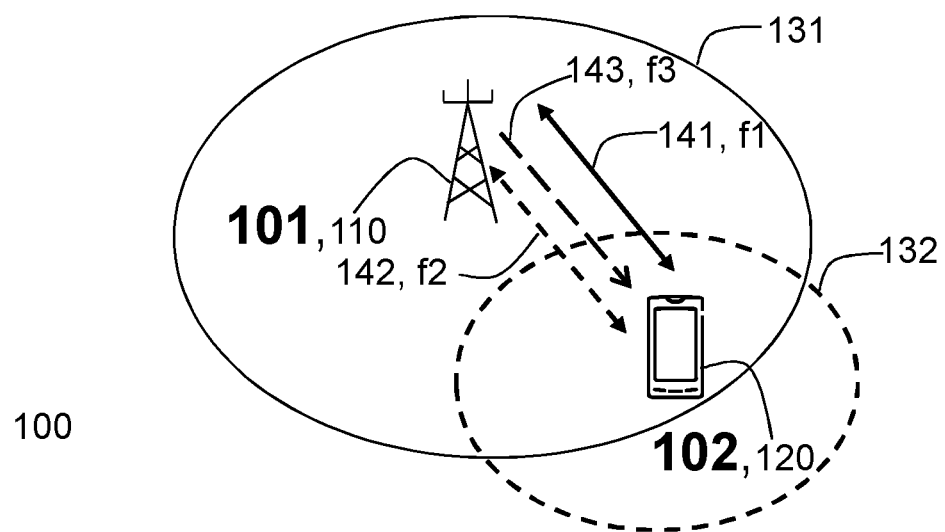
FIG. 4 is a schematic diagram illustrating an example of a communications network, according to some embodiments.

FIG. 4 depicts an example of a communications network 100, sometimes also referred to as a wireless communications network, cellular radio system, cellular network or wireless communications system, in which embodiments herein may be implemented. The communications network 100 may for example be a network such as a Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access (WCDMA), Universal Terrestrial Radio Access (UTRA) TDD, Global System for Mobile communications (GSM) network, GSM/Enhanced Data Rate for GSM Evolution (EDGE) Radio Access Network (GERAN) network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, WFi networks, Worldwide Interoperability for Microwave Access (WMax), 5G system or any cellular network or system. Thus, although terminology from 3GPP LTE may be used in this disclosure to exemplify embodiments herein, this should not be seen as limiting the scope of the embodiments herein to only the aforementioned system. The embodiments are described in particular for LTE/LTE-A. The embodiments are however applicable to any Radio Access Technology (RAT) or multi-RAT system, where a UE may operate using multiple carriers, e.g., LTE FDD/TDD, WCMDA/HSPA, Global System for Mobile communications (GSM)/GERAN, W Fi, Wireless Local Area Network (WLAN), WMax, Code division multiple access 2000 (CDMA2000) etc.

The communications network 100 comprises a plurality of communication devices, such as the first communication device 101, and the second communication device 102. Any of the first communication device 101 and the second communication device 102 may be a network node such as network node 110 described below, or a wireless device such as wireless device 120 described below. The first communication device 101 may be different than the second communication device 102. Typically, on the DL, the first communication device 101 will be the network node 110 and the second communication device 102 will be the wireless device 120. This corresponds to the non-limiting particular example illustrated in FIG. 4. In Device-to-Device (D2D) communications, both of the first communication device 101 and the second communication device 102 may be different wireless devices.

The communications network 100 comprises a plurality of network nodes whereof the network node 110 is depicted in FIG. 4. The network node 110 may be a network node as described above, e.g., a transmission point such as a radio base station, for example an eNB, an eNodeB, or an Home Node B, an Home eNode B or any other network node or unit capable to serve a wireless device, such as a user equipment or a machine type communication device in the communications network 100.

The communications network 100 covers a geographical area which is divided into cell areas, wherein each cell area is served by a network node, although, one network node may serve one or several cells. In the non-limiting example depicted in FIG. 4, the network node 110 serves a first cell 131, which may be a primary cell 131. The primary cell 131 may be in licensed spectrum. In FIG. 4, the network node 110 also serves a second cell 132, which may be a licensed-assisted access cell. The secondary cell 132 may be in unlicensed spectrum. The network node 110 may be of different classes, such as, e.g., macro eNodeB, home eNodeB or pico base station, femto Base Station, based on transmission power and thereby also cell size. Typically, the communications network 100 may comprise more cells similar to the first cell 131 and the second cell 132, served by their respective network node. This is not depicted in FIG. 4 for the sake of simplicity. The network node 110 may support one or several communication technologies, and its name may depend on the technology and terminology used. In 3GPP LTE, the network node 110, which may be referred to as eNodeBs or even eNBs, may be directly connected to one or more networks, e.g., core networks or the internet, which are not illustrated in FIG. 4. The network node 110 may be any of the nodes in these one or more networks.

A number of wireless devices may be located in the communications network 100. In the example scenario of FIG. 4, only a wireless device 120 also referred to herein as a user equipment or UE, which is located in the communication network 100, is shown. The wireless device 120 may e.g. be a mobile terminal or a wireless terminal, a mobile phone, a computer such as e.g. a laptop, a Personal Digital Assistant (PDA) or a tablet computer, sometimes referred to as a surf plate, with wireless capability, or any other radio network units capable to communicate over a radio link in a wireless communications network. Please note the term user equipment used in this document also covers other wireless devices such as Machine-to-machine (M2M) devices, even though they do not have any user.

The first communication device 101 may communicate with the second communication device 102 over a first radio link or primary carrier 141, e.g., in the primary cell 131, and over one or more radio links or one or more secondary carriers 142, e.g., in the secondary cell 132. In the non-limiting example of FIG. 4, only one arrow for the one or more secondary carriers 142 is depicted. The first communication device 101 may also communicate with the second communication device 102 over one carrier 143. As described earlier, in a particular example scenario, the first communication device 101 may be a macro node. The primary carrier 141 may use a first frequency (f1). A first secondary carrier of the one or more secondary carriers 142 may use a second frequency (f2) in the secondary cell 132, which may be a small cell within the macro cell using RRH deployment. The f1 and f2 may be deployed using FDD. The one carrier 143 may be an additional TDD configuration which may be deployed in the secondary cell 132 on another carrier frequency (f3). The one carrier 143 may be a non-standalone, downlink only, carrier. Hence, in some particular embodiments, the second communication device 102 may be configured with minimum 3 carriers. In some alternative embodiments, the one carrier 143 may be in the primary cell 141. The one carrier 143 may, in other embodiments, be one of the one or more secondary carriers 142 in the secondary cell 132.

In other examples than those depicted in FIG. 4, wherein the communications network 100 is a cellular system, the network node 110 may serve one or more cells. In other examples than those depicted in FIG. 4, wherein the communications network 100 is a non-cellular system, the network node 110 may serve receiving nodes with serving beams.

Any of the first communication device 101 and the second communication device 102 described above may be implemented in a so-called cloud solution, referring to that the implementation may be distributed, and any of the first communication device 101 and the second communication device 102 therefore may be so-called virtual nodes or virtual machines.

In this section, the embodiments herein will be illustrated in more detail by a number of exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

Several embodiments are comprised herein. More specifically, the following are embodiments related to the first communication device 101, e.g., a transmitting device or configuring device, and embodiments related to the second communication device 102, e.g., a receiving device related embodiments.

Figure 5:
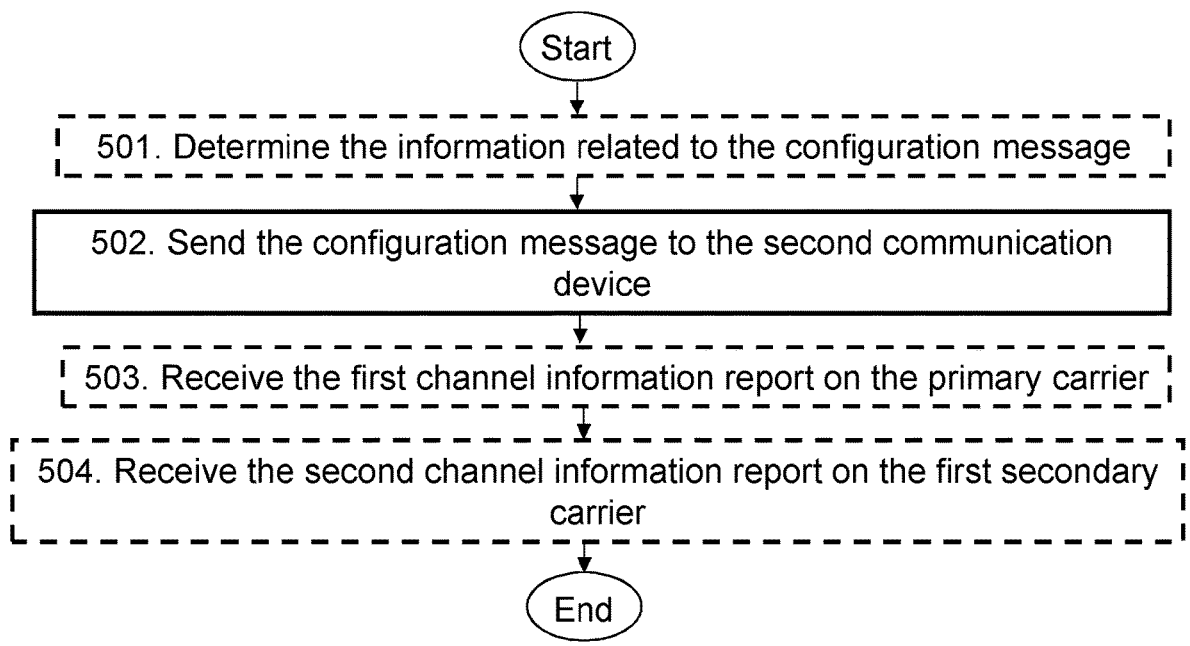
FIG. 5 is a schematic diagram illustrating embodiments of a method in a first communication device, according to some embodiments.

Embodiments of a method performed by the first communication device 101 for sending a configuration message to the second communication device 102, will now be described with reference to the flowchart depicted in FIG. 5. As mentioned earlier, the first communication device 101 and the second communication device 102 operate in the communications network 100, e.g. a wireless communications network.

The method comprises the following actions. In some embodiments all the actions may be performed. In some embodiments, one or more actions may be performed. One or more embodiments may be combined, where applicable. All possible combinations are not described to simplify the description. In FIG. 5, optional actions are indicated with dashed lines.

Action 501

As described earlier in relation to FIG. 4, the first communication device 101 may communicate with the second communication device 102 over the primary carrier 141 in the primary cell 131, over the one or more secondary carriers 142, e.g., in the secondary cell 132, and over the one carrier 143. The one carrier 143 may be a downlink only, non-standalone carrier. In such a scenario, in order for the second communication device 102 to be able to report channel information, e.g., CSI back to the first communication device 101, the second communication device 102 may not be able to send this information in the uplink over the one carrier 143, but it may need to do that over the primary carrier 141. According to embodiments herein, the first communication device 101 may then configure the second communication device 102 by sending the configuration message, as it will be described further down, so that the second communication device 102 may report the channel information to the first communication device 101 without using the primary carrier 141, which would then overload the carrier. For example, the loading of the primary carrier 141 may be reduced by having the second communication device 102 transmit the CSI reports on the primary carrier 141 and the one or more secondary carriers 142, e.g., alternatively. This may be achieved by the first communication device 101 configuring the second communication device 102 with two reporting intervals for the primary carrier 141 and the one or more secondary carriers 142, or with one, and the delta time interval between the two reports. The second communication device 102 may be so configured to send the channel information to the first communication device 102 on the primary carrier 141 on a first reporting time or T1, and on the one or more secondary carriers 142 on a second reporting time or T2. The delta time interval between the two reports may be referred to herein as T2-T1.

The configuration message is for configuring the second communication device 102 to report channel information, such as channel state information, about the one carrier 143 to the first communication device 101. The configuration message is also for configuring the second communication device 102 to report the channel information on a primary carrier 141 and on one or more secondary carriers 142. To report the channel information on a primary carrier 141 and on one or more secondary carriers 142, may be understood as comprising any of: a) reporting the channel information on a primary carrier 141 and on one or more secondary carriers 142 synchronously, b) reporting the channel information on a primary carrier 141 and on one or more secondary carriers 142 alternatively, and c) reporting the channel information on a primary carrier 141 and on one or more secondary carriers 142 at different time periods.

In some embodiments herein, a single instance of the channel information, e.g., a single CSI report, may be split between the primary carrier 141 and the on one or more secondary carriers 142. In other embodiments herein, different instances of the channel information, e.g., different CSI report, may be sent in the primary carrier 141 and the on one or more secondary carriers 142.

Hence, in some embodiments, the configuration message may be for further configuring the second communication device 102 to report the channel information on the primary carrier 141 in a first time period ($T_{p1}$) and on the one or more secondary carriers 142 in a second time period ($T_{p2}$).

Before sending the configuration message, the first communication device 101, may in this action determine information related to the configuration message. The information related to the configuration message may be, for example, configuration parameters for reporting the channel information, e.g., CSI configuration parameters. The information may comprise one or more of the following: a) information relating to the one carrier 143, about which the second communication device 102 is to report channel information, such as channel state information; the information relating to the one carrier 143 may be e.g., parameters for an additional TDD configuration, b) information relating to the primary carrier 141 and the one or more secondary carriers 142, which primary carrier 141 and one or more secondary carriers 142 the second communication device 102 is to use to report the channel information; the information relating to the primary carrier 141 and the one or more secondary carriers 142 may be, e.g., the number of carriers, it may be 1, 2 or more, and/or their respective frequencies, f1, f2, c) information relating to a reporting time for each of the primary carrier 141 and the one or more secondary carriers 142, the reporting time being for the second communication device 102 to report the channel information, that is, to send a report comprising the channel information. The determined information relating to the reporting time for each of the primary carrier 141 and the one or more secondary carriers 142 may comprise one or more of: a) an initial reporting time for the primary carrier 141 (T1) and the one or more secondary carriers 142 (T2), b) a periodicity of reporting for each one of the primary carrier 141 ($T_{p1}$) and the one or more secondary carriers 142 ($T_{p2}$), e.g., a first time period ($T_{p1}$) for the primary carrier 131, and a second time period ($T_{p2}$) for the one or more secondary carriers 142, wherein the first time period ($T_{p1}$) and a second time period ($T_{p2}$) may be different for each one of the carriers, c) a time difference of reporting, or delta, between a reporting time for one or more pairs of the primary carrier 141 and the one or more secondary carriers 142 (T2-T1), and d) a periodicity (Tp) of reporting for all of the primary carrier 141 and the one or more secondary carriers 142, wherein the periodicity (Tp) may be the same for all the carriers.

As used herein, "periodicity" may be understood to refer to a group of time periods for the primary carrier 131, and for the one or more secondary carriers 142, whether the time periods are different or the same for all or at least some of the carriers.

In some particular embodiments, this action 501 is therefore related to a method at the network node 110 for choosing the CSI configuration parameters.

Action 502

In order to configure the second communication device 102 to report the channel information about the one carrier 143 to the first communication device 102, in this Action the first communication device 101 sends the configuration message to the second communication device 102. The sending may be performed via e.g., the one carrier 143, the primary carrier 141 or the one or more secondary carriers 142. Sending a configuration message may also be understood herein as configuring.

In some particular embodiments, this action 501 is therefore related to a method at the first communication device 101, e.g., the network node 110 such as an eNode B, for conveying the CSI configuration parameters. For some embodiments, the first communication device 101 may need to send the information, e.g., the new CSI configuration parameters, to the second communication device 102, a UE, using Radio resource control (RRC) signaling or a higher layer message. The first communication device 101, e.g., may send these parameters when it may configure, that is, activate, the one carrier 143. In one embodiment, the first communication device 101 may sends the parameters $T_{p1}$, $T_{p2}$, the delta (T2-T1) to the second communication device 102.

In another embodiment, the first communication device 101 may send the information as described in the previous action, e.g., the number of carriers, which may be either 1 or 2 or more, the reporting period for each carrier ($T_{p1}$, $T_{p2}$), and/or the time difference between reporting between the carriers (delta).

In another embodiment, the first communication device 101 may send only one reporting period, Tp, for both the carriers, that is, the primary carrier 141 and the one or more secondary carriers 142, and the time difference between reporting between the carriers (delta).

In some particular embodiments, the configuration message may be for further configuring the second communication device 102 to report the channel information alternatively on the primary carrier 141 and on the one or more secondary carriers 142.

In another embodiment, the first communication device 101 may set the reporting period to be 0 for one of the carriers of the primary carrier 141 and the one or more secondary carriers 142. This implies that the first communication device 101 may not need CSI reporting for the TDD carrier on the carrier specified. For example, if the first communication device 101 estimates the load of that carrier, e.g., the primary carrier 141, to be high, then the it may set $T_{p1}=0$, which implies that the second communication device 102 may need to report CSI only on the one or more secondary carriers 142, e.g., on a first secondary carrier.

The configuration message may comprise the determined information in Action 501. According to the foregoing, the configuration message may comprise one or more of: a) the determined information relating to the one carrier 143 about which the second communication device 102 is to report channel information, b) the determined information relating to the primary carrier 141 and the one or more secondary carriers 142, which the second communication device 102 is to use to report the channel information, and c) the determined information relating to the reporting time for each of the primary carrier 141 and the one or more secondary carriers 142.

Action 503

In this Action, the first communication device 101 may receive a first channel information report, e.g., a first CSI report, from the second communication device 102 about the one carrier 143 in the primary carrier 141, according to the sent configuration message, e.g., in a first time period $T_{p1}$, starting at the first reporting time T1, with the first time period $T_{p1}$.

Action 504

In this Action, the first communication device 101 may receive a second channel information report, e.g., a second CSI report, from the second communication device 102 for the one carrier 143 in a first secondary carrier of the one or more secondary carriers 142, according to the sent configuration message, e.g., in second time period $T_{p2}$, starting at the second reporting time T2, with the second time period $T_{p2}$.

Figure 6:
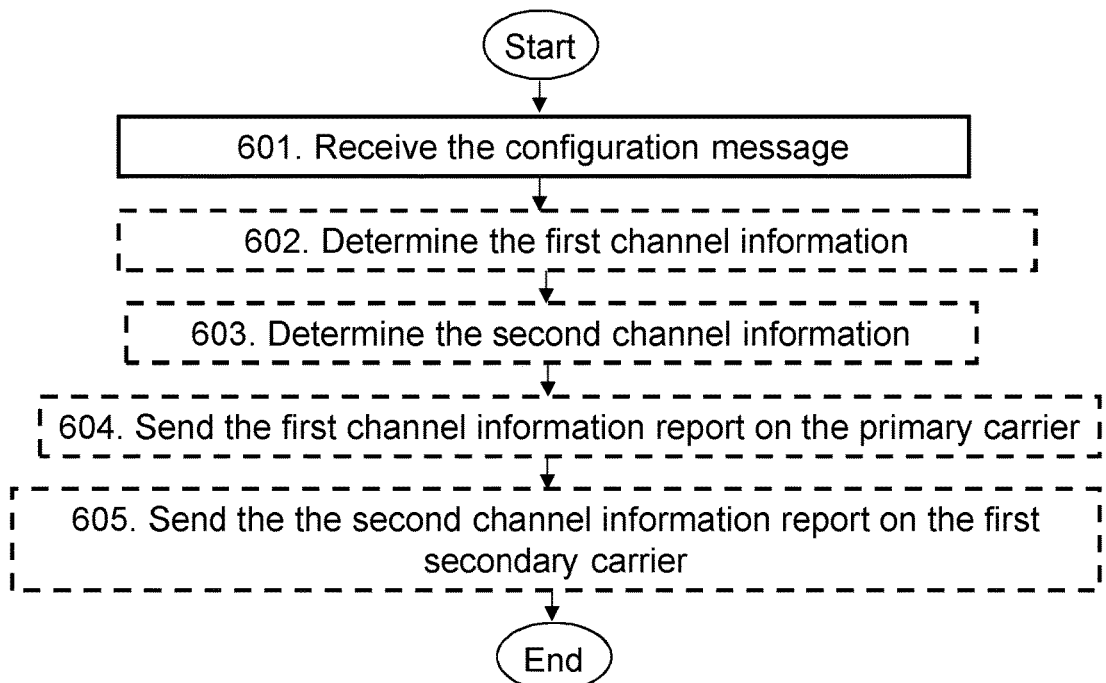
FIG. 6 is a schematic diagram illustrating actions of a method in a second communication device, according to some embodiments.

Embodiments of a performed by the second communication device 102 for reporting the channel information to the first communication device 101, will now be described with reference to the flowchart depicted in FIG. 6. As stated earlier, the first communication device 101 and the second communication device 102 operate in the communications network 100.

The detailed description of some of the following corresponds to the same references provided above, in relation to the actions described for the first communication device 101, and will thus not be repeated here. For example, the one carrier 143 may in some embodiments be a downlink, non-standalone carrier.

In some embodiments all the actions may be performed. In some embodiments, one or more actions may be performed. One or more embodiments may be combined, where applicable. All possible combinations are not described to simplify the description. In FIG. 6, optional actions are represented with dashed boxes.

Action 601

In this Action, the second communication device 102 receives the configuration message from the first communication device 101, e.g., via RRC signaling or a higher layer message. As stated earlier, the configuration message is for configuring the second communication device 102 to report channel information, such as channel state information, about the one carrier 143 to the first communication device 101. The configuration message is for further configuring the second communication device 102 to report the channel information on a primary carrier 141 and on one or more secondary carriers 142.

The received configuration message may comprise one or more of: a) the information relating to the one carrier 143, b) the information relating to the primary carrier 141 and the one or more secondary carriers 142 which the second communication device 102 is to use to report the channel information, and c) the information relating to the reporting time for each of the primary carrier 141 and the one or more secondary carriers 142.

In some embodiments, the information relating to the reporting time for each of the primary carrier 141 and the one or more secondary carriers 142 may comprise one or more of: a) the initial reporting time for the primary carrier 141 (T1) and the one or more secondary carriers 142 (T2), b) the periodicity of reporting for each one of the primary carrier 141 ($T_{p1}$) and the one or more secondary carriers 142 ($T_{p2}$), c) the time difference of reporting between the reporting time for one or more pairs of the primary carrier 141 and the one or more secondary carriers 142 (T2-T1), and d) the periodicity (Tp) of reporting for all of the primary carrier 141 and the one or more secondary carriers 142.

In some particular embodiments, the configuration message may be for further configuring the second communication device 102 to report the channel information alternatively on the primary carrier 141 and on the one or more secondary carriers 142.

Action 602

In this Action, the second communication device 102 may determine first channel information to be comprised in a first channel information report for the one carrier 143, according to the received configuration message, e.g., in the first time period. The first channel information report may be, e.g., a first CSI report. The first channel information may comprise a first set of, e.g., CQI, PMI, RI, etc. The determining may be based in e.g., measurements conducted by the second communication device 102 based on one or more reference signals transmitted by the first communication device 101, according to known methods. The one or more reference signals may be cell specific, or wireless device specific reference signals Action 603

In this Action, the second communication device 102 may determine second channel information to be comprised in a second channel information report for the one carrier 143, according to the received configuration message, e.g., in the second time period $T_{p2}$. The second channel information report may be, e.g., a second CSI report. The second channel information may comprise a second set of, e.g., CQI, PMI, RI, etc. . . . . . The determining may be based in e.g., measurements conducted by the second communication device 102 based on one or more reference signals transmitted by the first communication device 101, according to known methods. The one or more reference signals may be cell specific, or wireless device specific reference signals.

Action 604

Once the second communication device 102, that is, the receiving node, e.g., a UE, receives the information, e.g., the CSI configuration parameters, it may periodically report the CSI on the primary carrier 141 and/or the one or more secondary carriers 142 according to e.g., the reporting period as set by the first communication device 101.

In this Action, the second communication device 102 sends the first channel information report to the first communication device 101 for the one carrier 143 on the primary carrier 141, according to the received configuration message. The sending the first channel information report according to the received configuration message may be in the first time period ($T_{p1}$), e.g., with the initial reporting time T1.

Action 605

In this Action, the second communication device 102 sends the second channel information report to the first communication device 101 for the one carrier 143 on a first secondary carrier of the one or more secondary carriers 142, according to the received configuration message. The sending the second channel information report according to the received configuration message may be in the second time period ($T_{p2}$), e.g., with the initial reporting time T2.

In some particular embodiments, embodiments herein are therefore related to a method at the wireless device 120, a UE, for transmitting or reporting the CSI. According to embodiments herein when an additional TDD configuration is deployed in a scenario with more than 2 standalone carriers, the PUCCH overloading may be reduced by transmitting the CSI reports between the two carriers standalone on e.g., f1 and f2.

An advantage of embodiments herein is that since the channel information, e.g., the CSI feedback, is sent on more than one carrier, the load on the PUCCH of the primary carrier 141 is reduced thereby accommodating more legacy UEs to transmit the CSI on the primary carrier 141. In addition, the first communication device 101, the eNode B, may get frequent feedback without loading the primary carrier 141 for the additional TDD configuration thereby improving the downlink throughout significantly.

Figure 7:
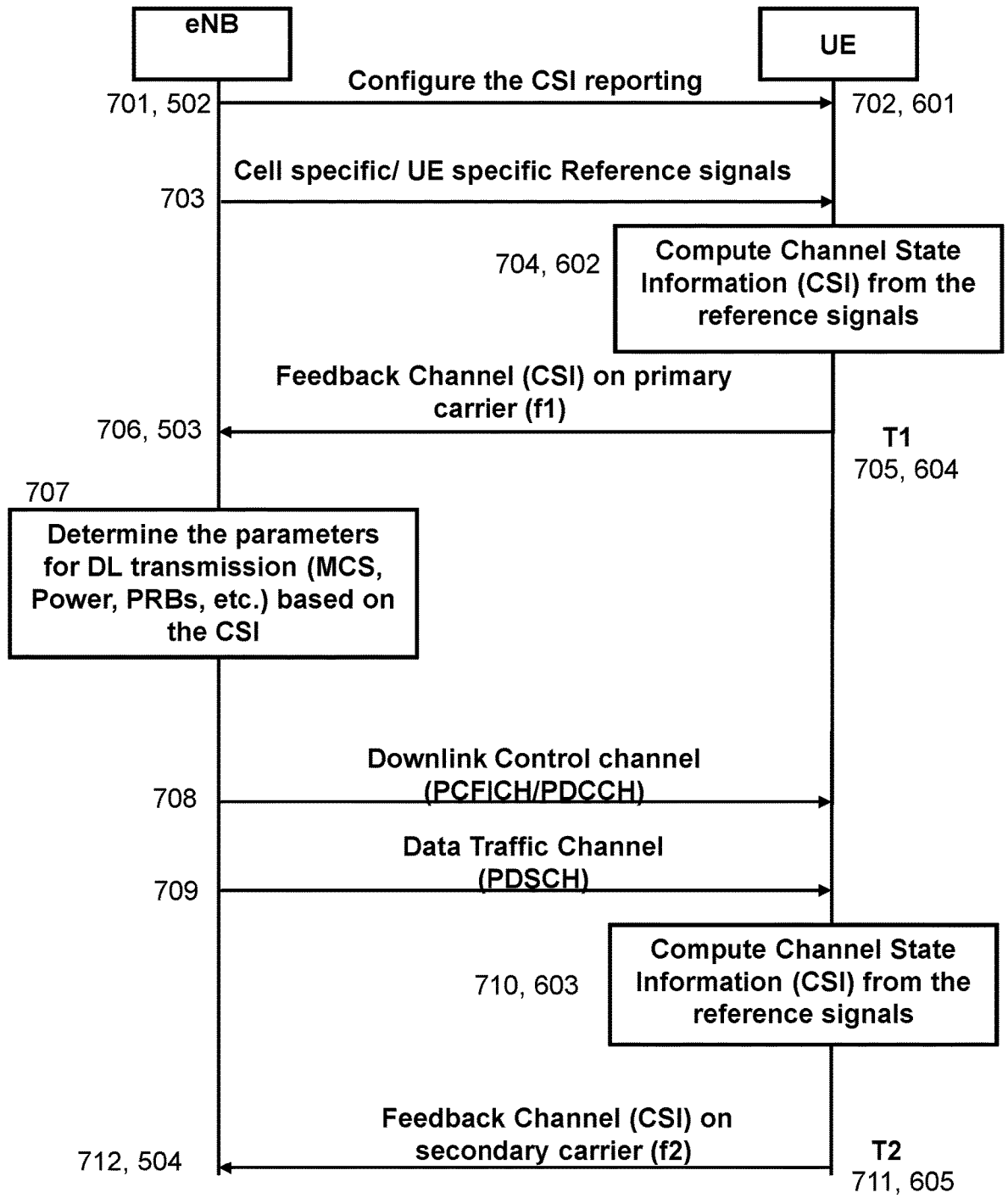
FIG. 7 is a schematic diagram illustrating a message sequence chart between an eNode B and a UE, according to some embodiments.

FIG. 7 shows a non-limiting example of a message sequence chart according to embodiments herein. In this non-limiting example, the first communication device 101 is an eNB and the second communication device is a UE. Initially, at 701, and in accordance with Action 502, the eNode B configures the UE with the additional TDD configuration for the one carrier 143, and the CSI reporting parameters. The CSI parameters have been described earlier. The UE receives the configuration message at 702, in accordance with Action 602. From the reference signals, e.g., cell specific and/or UE specific signals transmitted by the eNB at 703, the UE estimates the CSI at 704 according to Action 602. At 705, and in accordance with Action 604, the UE conveys this information in the first channel information report using PUCCH of the primary carrier 141 with f1 at T1, which is received by the eNB at 706 in accordance with Action 503. At 707, the eNB determines the parameters for downlink transmission, such as MCS, power, PRBs, etc. . . . based on the received CSI at 706. At 708, the eNB transmits the downlink control channels PCFICH and PDCCH, and the data traffic channel PDSCH at 709. However, at 710, and in accordance with Action 603, at time T2, which is different compared to T1, the UE estimates CSI parameters for the third carrier, referred to herein as the one carrier 143, and conveys this information in the second channel information report using PUCCH of the one or more secondary carriers 142 with f2 at 711, in accordance with Action 605. The second channel information report is received by the eNB at 712, according to Action 504. Although not explicitly depicted in FIG. 7, again at T1+$T_{p1}$, the UE may estimate the CSI parameters and conveys a third channel information report using the primary carrier 141 PUCCH, where $T_{p1}$ is the periodicity of the CSI reporting on the primary carrier 141. Similarly, at time T2+$T_{p2}$, the may UE estimate the CSI parameters and conveys a fourth channel information report using the secondary carrier PUCCH, where $T_{p2}$ is the periodicity of the CSI reporting on secondary carrier. The parameters $T_{p1}$, $T_{p2}$ and the difference T2-T1 may be configured by the eNB as part of CSI reporting parameters in the configuration message, which may be a higher layer signaling message.

To perform the method actions described above in relation to FIGS. 5 and 7, the first communication device 101 is configured to send the configuration message to the second communication device 102. The first communication device 101 may comprise the following arrangement depicted in FIG. 8. The first communication device 101 and the second communication device 102 are configured to operate in the communications network 100.

The detailed description of some of the following corresponds to the same references provided above, in relation to the actions described for the first communication device 101, and will thus not be repeated here. For example, in some embodiments, the one carrier 143 is a downlink, non-standalone carrier.

The first communication device 101 is further configured to, e.g., by means of a sending module 801 configured to, send the configuration message to the second communication device 102. The configuration message is configured to configure the second communication device 102 to report channel information about the one carrier 143 to the first communication device 101. The configuration message is also configured to configure the second communication device 102 to report the channel information on the primary carrier 141 and on the one or more secondary carriers 142.

The sending module 801 may be a processor 805 of the first communication device 101, or an application running on such processor.

The first communication device 101 may be further configured to, e.g., by means of a determining module 802 configured to, determine the information related to the configuration message, the information comprising one or more of: a) the information relating to the one carrier 143, b) the information relating to the primary carrier 141 and the one or more secondary carriers 142, c) the information relating to the reporting time for each of the primary carrier 141 and the one or more secondary carriers 142, the reporting time being for the second communication device 102 to report the channel information. The determining module 802 may be the processor 805 of the first communication device 101, or an application running on such processor.

The configuration message may comprise one or more of: a) the determined information relating to the one carrier 143, b) the determined information relating to the primary carrier 141 and the one or more secondary carriers 142, and c) the determined information relating to the reporting time for each of the primary carrier 141 and the one or more secondary carriers 142.

The determined information relating to the reporting time for each of the primary carrier 141 and the one or more secondary carriers 142 may comprise one or more of: a) the initial reporting time for the primary carrier 141 (T1) and the one or more secondary carriers 142 (T2), b) the periodicity ($T_{p1}$, $T_{p2}$) of reporting for each one of the primary carrier 141 and the one or more secondary carriers 142, c) the time difference of reporting between the reporting time for the one or more pairs of the primary carrier 141 and the one or more secondary carriers 142 (T2-T1), and d) the periodicity (Tp) of reporting for all of the primary carrier 141 and the one or more secondary carriers 142.

The configuration message may be configured to further configure the second communication device 102 to report the channel information on the primary carrier 141 in a first time period ($T_{p1}$) and on the one or more secondary carriers 142 in a second time period ($T_{p2}$).

In some embodiments, the configuration message may be configured to further configure the second communication device 102 to report the channel information alternatively on the primary carrier 141 and on the one or more secondary carriers 142.

The first communication device 101 may be further configured to, e.g., by means of a receiving module 803 configured to, receive the first channel information report from the second communication device 102 about the one carrier 143 in the primary carrier 141, according to the sent configuration message. The receiving module 803 may be the processor 805 of the first communication device 101, or an application running on such processor.

The first communication device 101 may be further configured to, e.g., by means of the receiving module 803 configured to, receive the second channel information report from the second communication device 102 for the one carrier 143 in the first secondary carrier of the one or more secondary carriers 142, according to the sent configuration message.

The first communication device 101 may be configured to perform other actions with other modules 804 configured to perform these actions within the first communication device 101. Each of the other modules 804 may be the processor 805 of the first communication device 101, or an application running on such processor.

Figure 8:
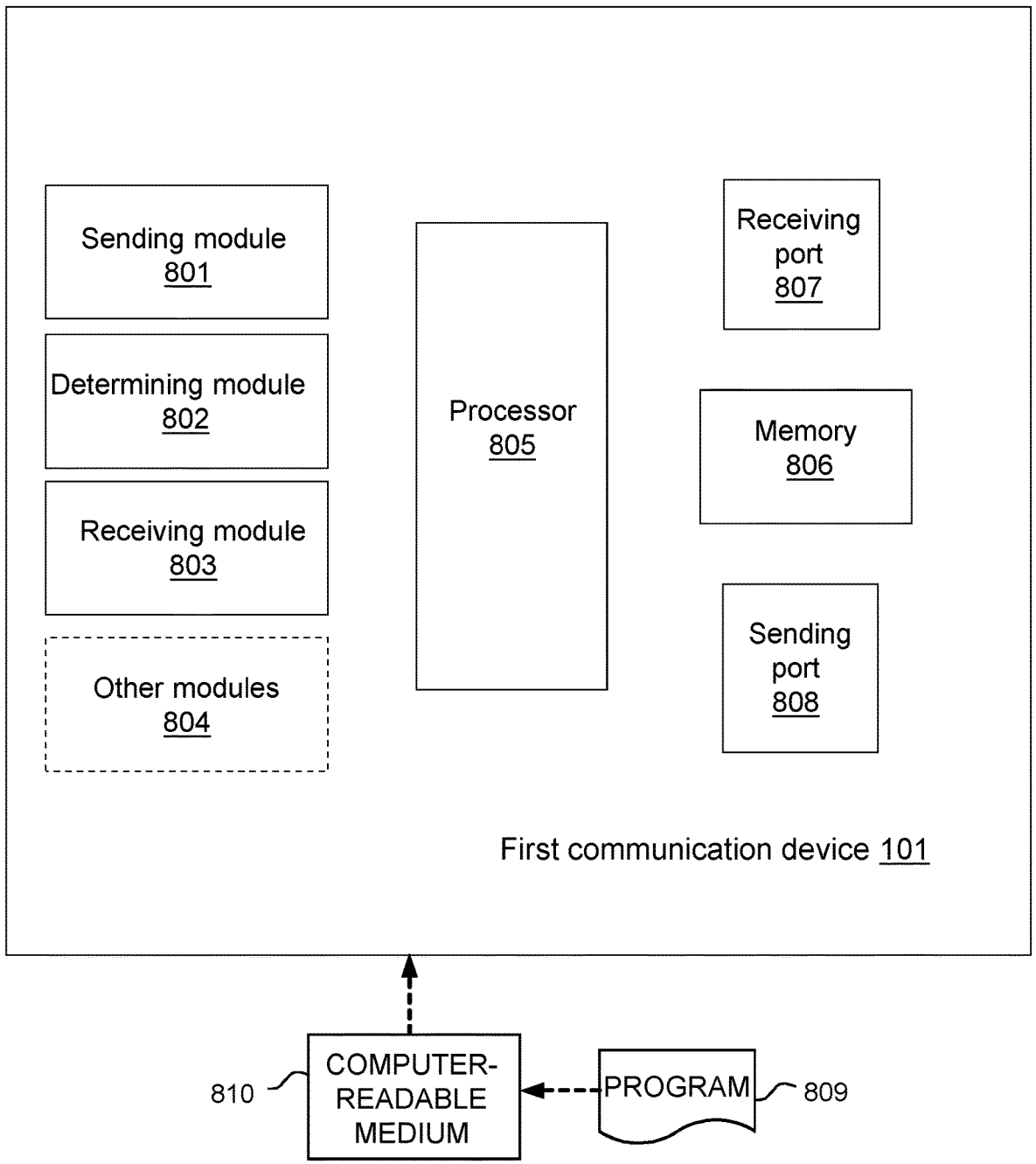
FIG. 8 is a block diagram of a first communication device that is configured according to some embodiments.

The embodiments herein may be implemented through one or more processors, such as the processor 805 in the first communication device 101 depicted in FIG. 8, together with computer program code for performing the functions and actions of the embodiments herein. The program code mentioned above may also be provided as a computer program product, for instance in the form of a data carrier carrying computer program code for performing the embodiments herein when being loaded into the in the first communication device 101. One such carrier may be in the form of a CD ROM disc. It is however feasible with other data carriers such as a memory stick. The computer program code may furthermore be provided as pure program code on a server and downloaded to the first communication device 101.

The first communication device 101 may further comprise a memory 806 comprising one or more memory units. The memory 806 is arranged to be used to store obtained information, store data, configurations, schedulings, and applications etc. to perform the methods herein when being executed in the first communication device 101.

In some embodiments, the first communication device 101 may receive information, e.g., from the second communication device 102, through a receiving port 807. In some embodiments, the receiving port 807 may be, for example, connected to the two or more antennas in first communication device 101. In other embodiments, the first communication device 101 may receive information from another structure in the communications network 100 through the receiving port 807. Since the receiving port 807 may be in communication with the processor 805, the receiving port 807, may then send the received information to the processor 805. The receiving port 807 may also be configured to receive other information.

The processor 805 in the first communication device 101 may be further configured to transmit or send information to e.g., to the second communication device 102, through a sending port 808, which may be in communication with the processor 805 and the memory 806.

The first communication device 101 may comprise an interface unit to facilitate communications between the first communication device 101 and other nodes or devices, e.g., the second communication device 102. The interface may, for example, include a transceiver configured to transmit and receive radio signals over an air interface in accordance with a suitable standard.

Those skilled in the art will also appreciate that the sending module 801, the determining module 802, the receiving module 803, and the other modules 804 described above may refer to a combination of analog and digital modules, and/or one or more processors configured with software and/or firmware, e.g., stored in memory, that, when executed by the one or more processors such as the processor 805 perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 801-804 described above may be implemented as one or more applications running on one or more processors such as the processor 805.

Thus, the methods according to the embodiments described herein for the first communication device 101 may be implemented by means of a computer program 809 product, comprising instructions, i.e., software code portions, which, when executed on at least one processor 805, cause the at least one processor 805 to carry out the actions described herein, as performed by the first communication device 101. The computer program 809 product may be stored on a computer-readable storage medium 810. The computer-readable storage medium 810, having stored thereon the computer program 809, may comprise instructions which, when executed on at least one processor 805, cause the at least one processor 805 to carry out the actions described herein, as performed by the first communication device 101. In some embodiments, the computer-readable storage medium 810 may be a non-transitory computer-readable storage medium, such as a CD ROM disc, or a memory stick. In other embodiments, the computer program 809 product may be stored on a carrier containing the computer program 809 just described, wherein the carrier is one of an electronic signal, optical signal, radio signal, or the computer-readable storage medium, as described above.

To perform the method actions described above in relation to FIGS. 6 and 7, the second communication device 102 is configured to report channel information to the first communication device 101. The second communication device 102 may comprise the following arrangement depicted in FIG. 9. The first communication device 101 and the second communication device 102 are configured to operate in the communications network 100.

The detailed description of some of the following corresponds to the same references provided above, in relation to the actions described for the second communication device 102, and will thus not be repeated here. For example, in some embodiments, the one carrier 143 is a downlink, non-standalone carrier.

The second communication device 102 is further configured to, e.g., by means of a receiving module 901 configured to, receive the configuration message from the first communication device 101. The configuration message is configured to configure the second communication device 102 to report the channel information about the one carrier 143 to the first communication device 101. The configuration message is also configured to further configure the second communication device 102 to report the channel information on the primary carrier 141 and on the one or more secondary carriers 142.

The receiving module 901 may be a processor 905 of the second communication device 102, or an application running on such processor.

The first communication device 101 is further configured to, e.g., by means of a sending module 902 configured to, send the first channel information report to the first communication device 101 for the one carrier 143 on the primary carrier 141, according to the received configuration message. The sending module 902 may be the processor 905 of the second communication device 102, or an application running on such processor.

The first communication device 101 may be further configured to, e.g., by means of the sending module 902 configured to, send the second channel information report to the first communication device 101 for the one carrier 143 on the first secondary carrier of the one or more secondary carriers 142, according to the received configuration message.

In some embodiments, to send the first channel information report according to the received configuration message may be configured to be in the first time period ($T_{p1}$), and to send the second channel information report according to the received configuration message may be configured to be in the second time period ($T_{p2}$).

In some embodiments, the configuration message may be for further configuring the second communication device 102 to report the channel information alternatively on the primary carrier 141 and on the one or more secondary carriers 142.

The received configuration message may comprise one or more of: a) the information relating to the one carrier 143, b) the information relating to the primary carrier 141 and the one or more secondary carriers 142 which the second communication device 102 is to use to report the channel information, and c) the information relating to the reporting time for each of the primary carrier 141 and the one or more secondary carriers 142.

The information relating to the reporting time for each of the primary carrier 141 and the one or more secondary carriers 142 may comprise one or more of: a) the initial reporting time for the primary carrier 141 (T1) and the one or more secondary carriers 142 (T2), b) the periodicity ($T_{p1}$, $T_{p2}$) of reporting for each one of the primary carrier 141 and the one or more secondary carriers 142, c) the time difference of reporting between the reporting time for the one or more pairs of the primary carrier 141 and the one or more secondary carriers 142 (T2-T1), and d) the periodicity (Tp) of reporting for all of the primary carrier 141 and the one or more secondary carriers 142.

The second communication device 102 may be further configured to, e.g., by means of a determining module 903 configured to, determine the first channel information to be comprised in the first channel information report, according to the received configuration message. The determining module 903 may be the processor 905 of the second communication device 102, or an application running on such processor.

The first communication device 101 may be further configured to, e.g., by means of the determining module 903 configured to, determine the second channel information to be comprised in the second channel information report, according to the received configuration message.

The second communication device 102 may be configured to perform other actions with other modules 904 configured to perform these actions within the second communication device 102. Each of the other modules 904 may be the processor 905 of the second communication device 102, or an application running on such processor.

Figure 9:
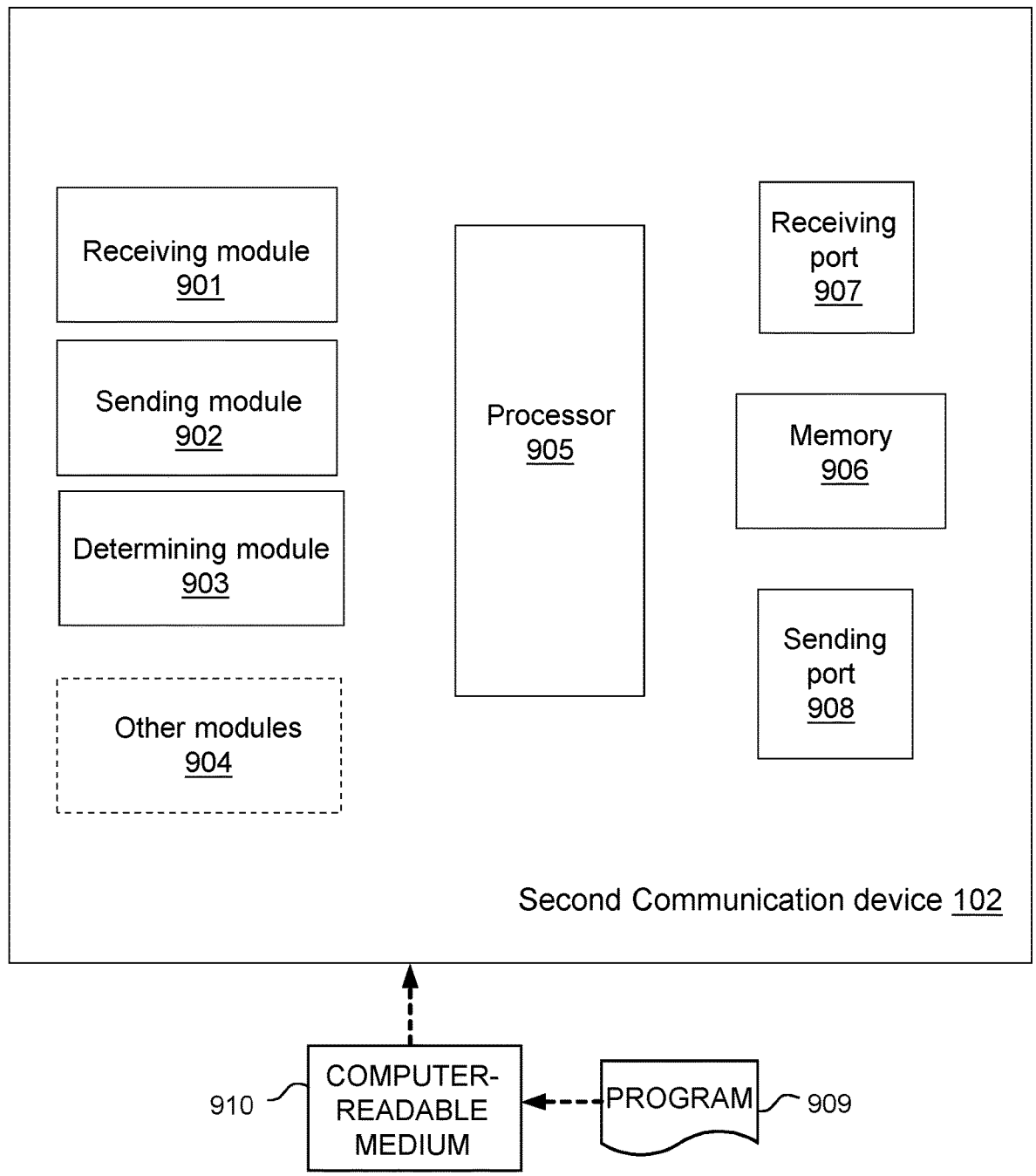
FIG. 9 is a block diagram of a second communication device that is configured according to some embodiments.

The embodiments herein may be implemented through one or more processors, such as the processor 905 in second communication device 102 depicted in FIG. 9, together with computer program code for performing the functions and actions of the embodiments herein. The program code mentioned above may also be provided as a computer program product, for instance in the form of a data carrier carrying computer program code for performing the embodiments herein when being loaded into the in the second communication device 102. One such carrier may be in the form of a CD ROM disc. It is however feasible with other data carriers such as a memory stick. The computer program code may furthermore be provided as pure program code on a server and downloaded to the second communication device 102.

The second communication device 102 may further comprise a memory 906, comprising one or more memory units. The memory 906 is arranged to be used to store obtained information, store data, configurations, schedulings, and applications etc. to perform the methods herein when being executed in the second communication device 102.

In some embodiments, the second communication device 102 may receive information, e.g., from the first communication device 101, through a receiving port 907. In some embodiments, the receiving port 907 may be, for example, connected to the two or more antennas in the second communication device 102. In other embodiments, the second communication device 102 may receive information from another structure in the communications network 100 through the receiving port 907. Since the receiving port 907 may be in communication with the processor 905, the receiving port 907, may then send the received information to the processor 905. The receiving port 907 may also be configured to receive other information.

The processor 905 in the second communication device 102 may be further configured to transmit or send information to e.g., to the first communication device 101, through a sending port 908, which may be in communication with the processor 905 and the memory 906.

The second communication device 102 may comprise an interface unit to facilitate communications between the second communication device 102 and other nodes or devices, e.g., the first communication device 101. The interface may, for example, include a transceiver configured to transmit and receive radio signals over an air interface in accordance with a suitable standard.

Those skilled in the art will also appreciate that the receiving module 901, the sending module 902, the determining module 903, and the other modules 904, described above may refer to a combination of analog and digital modules, and/or one or more processors configured with software and/or firmware, e.g., stored in memory, that, when executed by the one or more processors such as the processor 905 perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 901-904 described above may be implemented as one or more applications running on one or more processors such as the processor 905.

Thus, the methods according to the embodiments described herein for the second communication device 102 may be implemented by means of a computer program 909 product, comprising instructions, i.e., software code portions, which, when executed on at least one processor 905, cause the at least one processor 905 to carry out the actions described herein, as performed by the second communication device 102. The computer program 909 product may be stored on a computer-readable storage medium 910. The computer-readable storage medium 910, having stored thereon the computer program 909, may comprise instructions which, when executed on at least one processor 905, cause the at least one processor 905 to carry out the actions described herein, as performed by the second communication device 102. In some embodiments, the computer-readable storage medium 910 may be a non-transitory computer-readable storage medium, such as a CD ROM disc, or a memory stick. In other embodiments, the computer program 909 product may be stored on a carrier containing the computer program 909 just described, wherein the carrier is one of an electronic signal, optical signal, radio signal, or the computer-readable storage medium, as described above.

Further Object of the Present Disclosure

It is a further object of the present disclosure to improve the performance of a communications network by providing improved methods of sending a downlink control channel. Within this section, the term "further disclosure" may be understood to refer to a group of embodiments which is different to those that have been described thus far.

As part of the development of further disclosure herein, another problem with existing methods will first be identified and discussed.

Figure 10A:
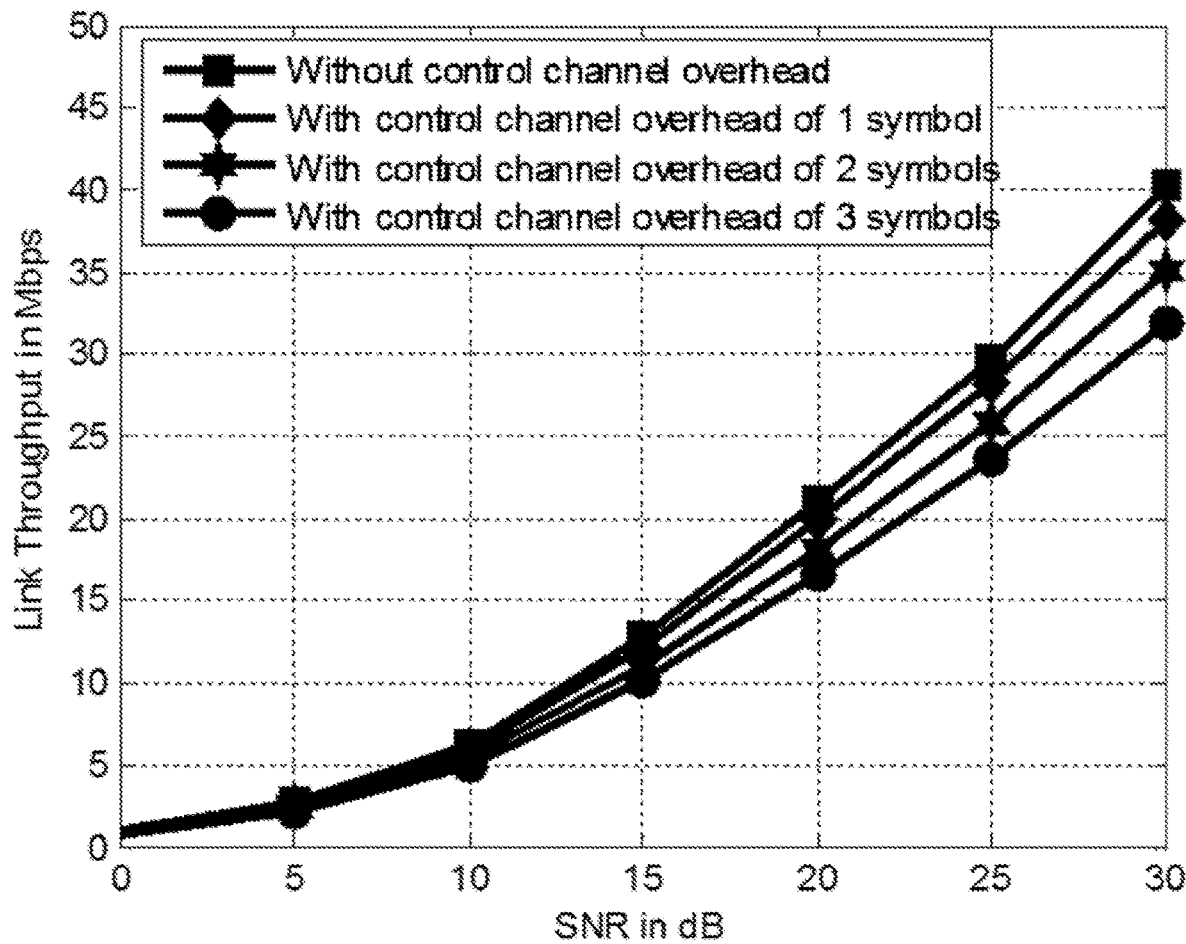
FIG. 10a is a schematic diagram illustrating a link throughput with various values of control channel overhead, according to existing methods.

As explained in the section entitled Message Sequence Chart of Downlink Transmission, the eNode B may need to send the scheduling information whenever it schedules the UE with downlink data. Typically the first 3 OFDM symbols in the subframe may be used for transmit the PDCCH. The exact number of OFDM symbols may be indicated by the contents of the PCFICH. FIG. 10a shows the link throughput performance of an LTE system with control channel overhead of 1-3 OFDM symbols. For reference purposes, the link performance without any overhead of control channel is also plotted. It may be seen that the link throughput, represented in Megabytes per second (Mbps) is reduced when the overhead increases.

Figure 10B:
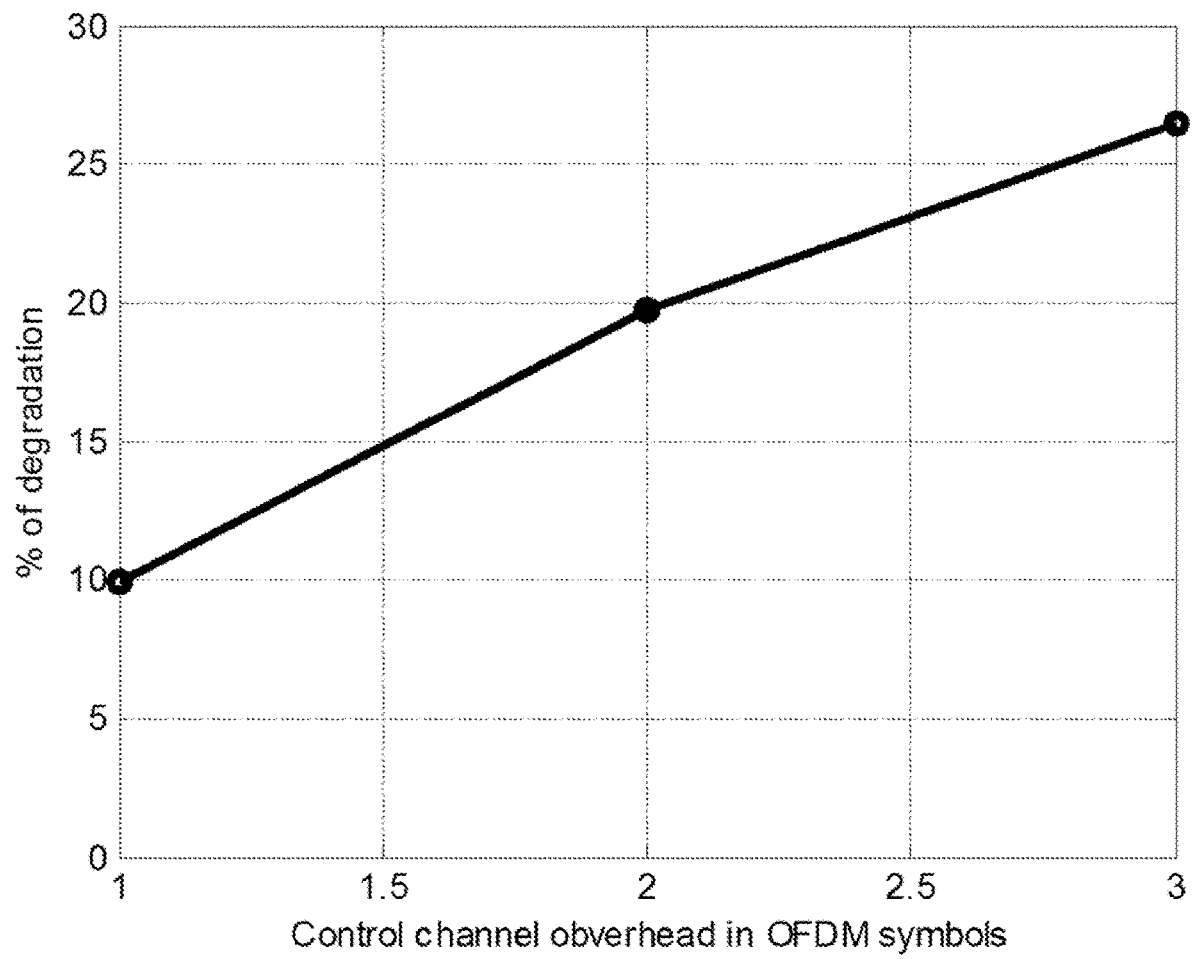
FIG. 10b is a schematic diagram illustrating a throughput reduction at SNR of 30 dB, according to existing methods.

FIG. 10b shows that the percentage of degradation at a Signal to Noise Ratio (SNR) of 30 deciBels (dB) is around 10-27%, where the 10% corresponds to the overhead of 1 OFDM symbol and 27% of loss corresponds to the 3 OFDM symbols of overhead. Hence, to reduce the throughput reduction an efficient mechanism of transmitting the control channel may be need.

Further disclosure herein may be related to wireless communication systems and in particular a method related to transmitting downlink control channel in time division duplex systems, that is, to a method to transmit downlink control channel in a TDD wireless communication system. Further disclosure herein may be related to Downlink control channel, TDD, FDD, carrier aggregation, downlink only, LTE, LTE-A, PDCCH, ePDCCH.

Further disclosure herein may provide an efficient mechanism for transmitting the downlink control information, where the eNode B may indicate to the UE about the scheduling parameters, in a similar way to the conventional procedure. In addition, it may indicate for how many subframes the scheduling information may be valid, and the partial scheduling that may be valid for the remaining subframes. In the subsequent, subframes, it may not transmit any control information to the UE. Hence, the eNode B may use the first 3 OFDM symbols of these subframes for data transmission, thereby improving the link and system throughput.

Several embodiments are comprised herein. More specifically, the followings are first communication device, e.g., a transmitting device, related embodiments, and second communication device, e.g., a receiving device related embodiments.

Figure 11:
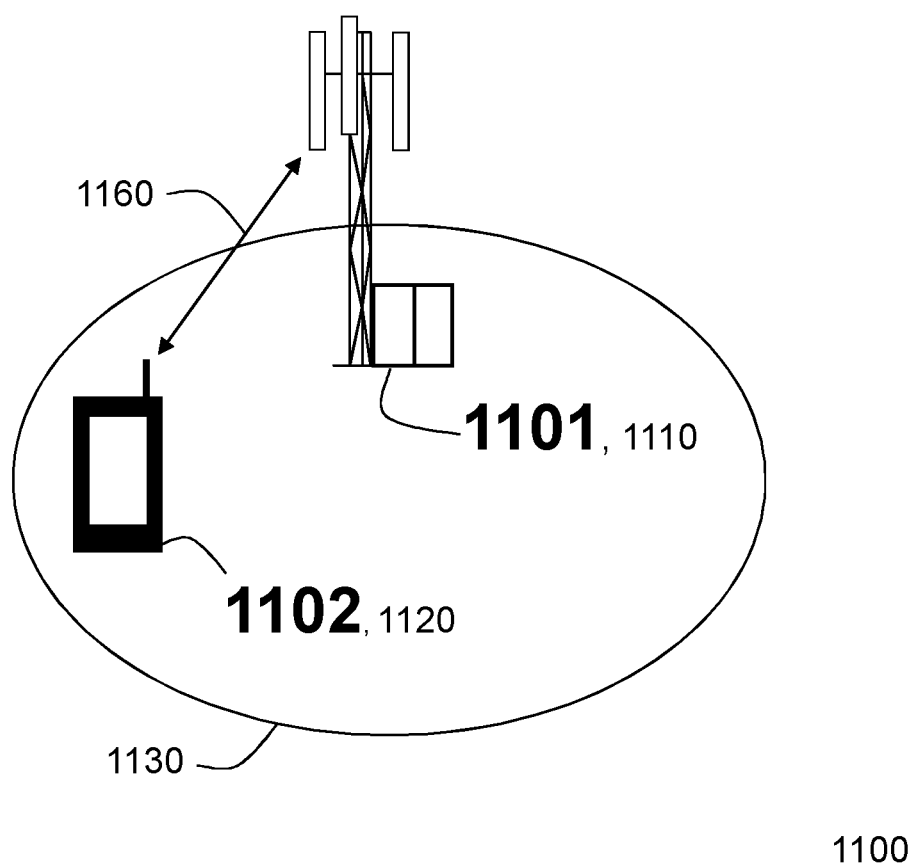
FIG. 11 is a schematic diagram illustrating an example of a communications network, according to some embodiments.

FIG. 11 depicts an example of a communications network 1100 in which embodiments herein may be implemented. The wireless communications network 1100 has a similar description as the communications network 100, and will therefore not be repeated here, unless otherwise noted. The communications network 1100 comprises a first communication device 1101 and a second communication device 1102. The first communication device 1101 has a similar description as the first communication device 101 described earlier, and will therefore not be repeated here. The second communication device 1102 has a similar description as the second communication device 102 described earlier, and will therefore not be repeated here.

The communications network 1100 comprises a plurality of network nodes whereof the network node 1110 is depicted in FIG. 11. The network node 1110 has a similar description as the network node 110 described earlier, and will therefore not be repeated here. In the examples depicted in FIG. 11, the network node 110 serves a cell 1130. Typically, the communications network 1100 may comprise more cells similar to cell 1130, served by their respective network nodes. This is not depicted in FIG. 11 for the sake of simplicity.

A number of wireless devices are located in the communications network 1100. In the example scenario of FIG. 11, only one wireless device is shown, wireless device 1120. Any reference to a "user node", "UE", "mobile station" or "MS" herein is meant to comprise a reference to the wireless device 1120, indistinctively, unless noted otherwise. The wireless device 1120 has a similar description as the wireless device 120 described earlier, and will therefore not be repeated here.

The wireless device 1120 is a wireless communication device such as a mobile station which is also known as e.g. mobile terminal, wireless terminal and/or UE. The device is wireless, i.e., it is enabled to communicate wirelessly in the wireless communication network 1100, sometimes also referred to as a cellular radio system or cellular network. The communication may be performed e.g., between two devices, between a device and a regular telephone and/or between a device and a server. The communication may be performed e.g., via a RAN and possibly one or more core networks, comprised within the communications network 1100.

The wireless device 1120 may further be referred to as a mobile telephone, cellular telephone, or laptop with wireless capability, just to mention some further examples. The wireless device 1120 in the present context may be, for example, portable, pocket-storable, hand-held, computer-comprised, or vehicle-mounted mobile devices, enabled to communicate voice and/or data, via the RAN, with another entity, such as a server, a laptop, a Personal Digital Assistant (PDA), or a tablet computer, sometimes referred to as a surf plate with wireless capability, Machine-to-Machine (M2M) devices, devices equipped with a wireless interface, such as a printer or a file storage device or any other radio network unit capable of communicating over a radio link in a cellular communications system.

The wireless device 1120 may communicate with the network node 1110 over a radio link 1160, e.g., via a primary carrier, such as the primary carrier 141 and a secondary carrier, such as any one of the one or more secondary carriers 142.

Figure 12:
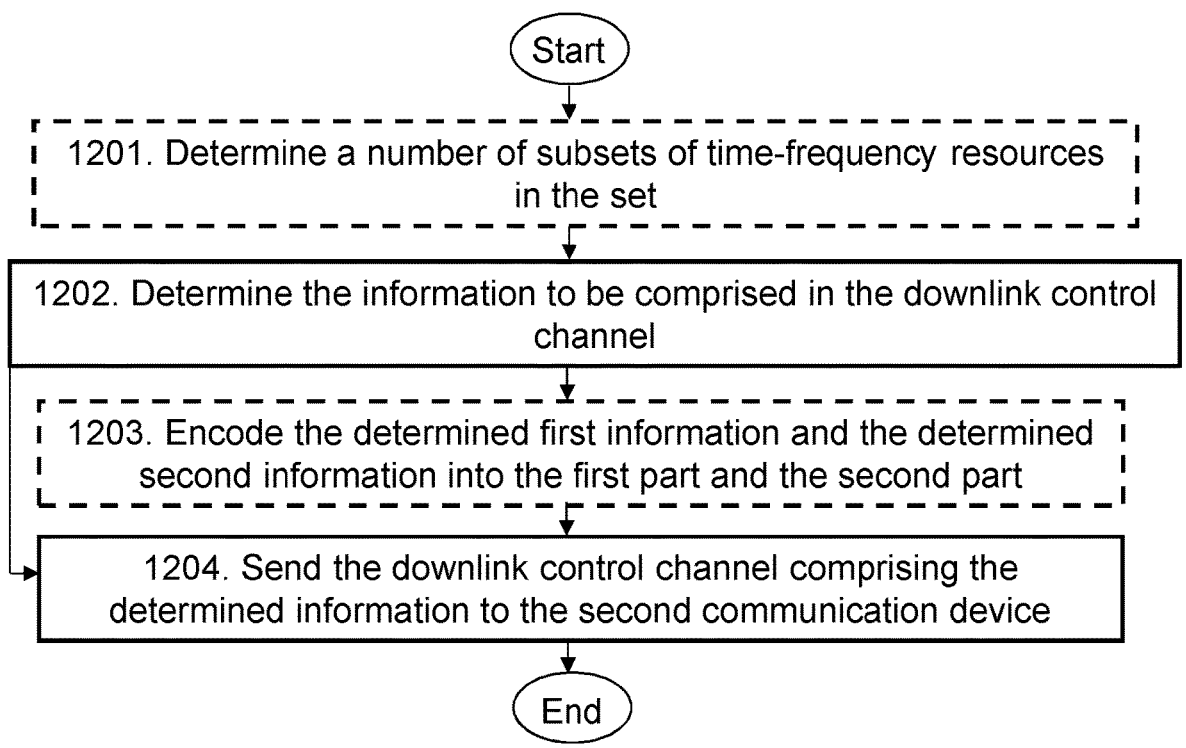
FIG. 12 is a schematic diagram illustrating an example of a method in a first communication device, according to further disclosure.
Figure 13:
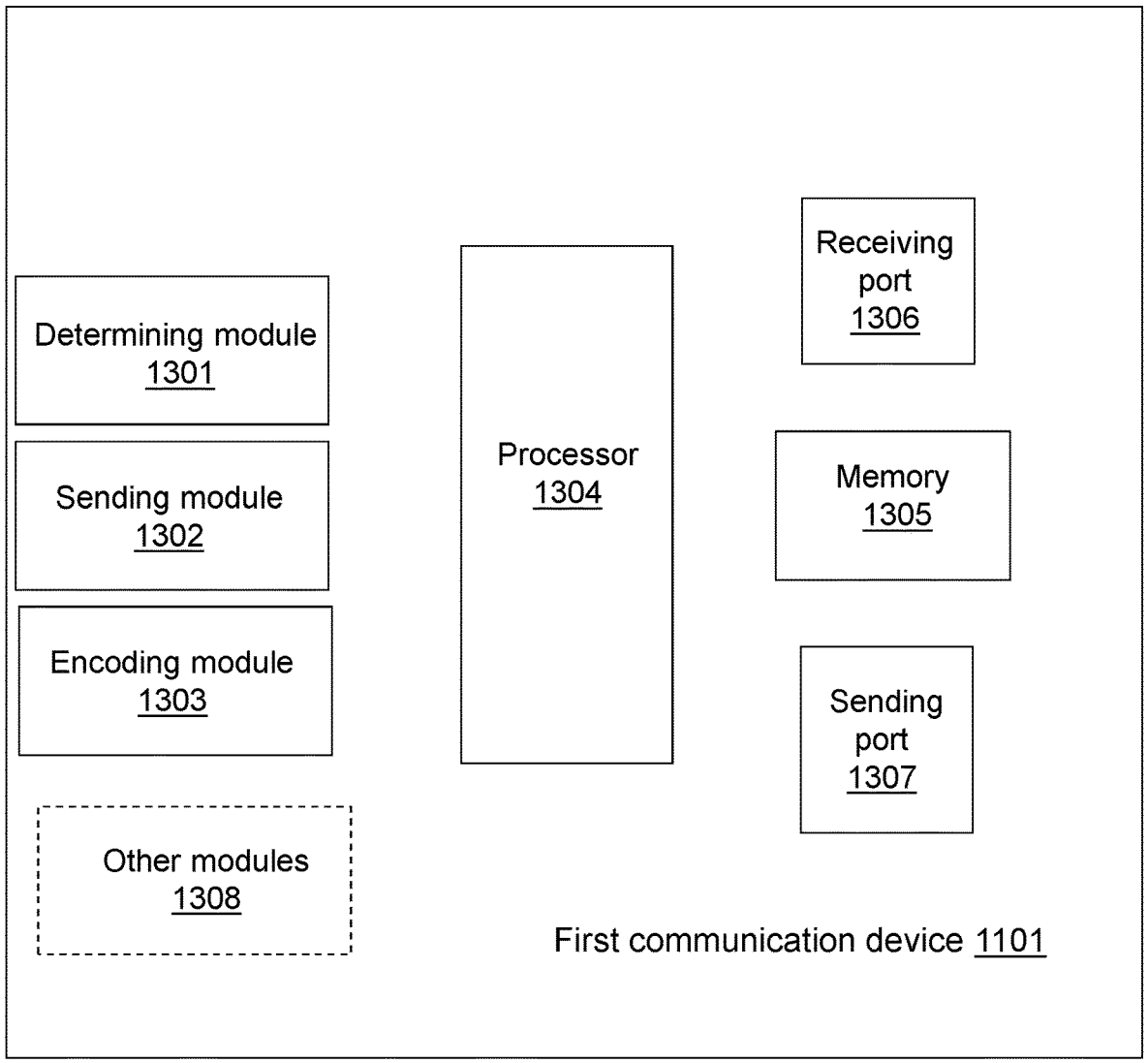
FIG. 13 is a block diagram of a first communication device that is configured according to further disclosure.

The first communication device further disclosure relates to FIGS. 12 and 13. FIG. 12 is a flowchart illustrating an example of a method performed by a first communication device such as the first communication device 1101, e.g., the network node 1110. FIG. 13 is a block diagram of a first communication device that is configured according to further disclosure.

The method performed by the first communication device is for sending a downlink control channel to a second communication device, such as the second communication device 1102, e.g., the wireless device 1120. The first communication device 1101 and the second communication device 1102 operate in the communications network 1100, e.g. a wireless communications network. The method may comprise one or more of the following actions:

Determining 1202 information, such as one or more parameters, to be comprised in the downlink control channel to be sent to the second communication device 1102. The downlink control channel may comprise a first part and a second part, the first part comprising a first information, such as one or more first downlink scheduling parameters. The first information being may be applicable to a first subset of time-frequency resources, such as a current TTI, in a set of time-frequency resources, such as a frame. The second part may comprise a second information, such as one or more second downlink scheduling parameters. The second information may be valid for a remaining number of subsets of time-frequency resources in the set of time-frequency resources, such as a remaining number of TTI in the frame. The first information may comprise at least some information applicable to the remaining number of subsets of time-frequency resources in the set of time-frequency resources, that is, to the remaining number of TTI in the frame. The first communication device 1101 may be configured to perform this action 802, e.g. by means of a determining module 1301 configured to perform this action, within the first communication device 1101. The determining module 1301 may be a processor 1304 of the first communication device 1101, or an application running on such processor.

Sending 1204 the downlink control channel comprising the determined information to the second communication device 1102 in the first subset of time-frequency resources. The first communication device 1101 is configured to perform this action 1204, e.g. by means of a sending module 1302 configured to perform this action, within the first communication device 1101. The sending module 1302 may be the processor 1304 of the first communication device 1101, or an application running on such processor.

Determining 1201 a number of subsets of time-frequency resources in the set of time-frequency resources, such as a number of TTIs in the frame, wherein the second communication device 1102 is to be scheduled consecutively. The first communication device 1101 may be configured to perform this action 1201, e.g. by means of the determining module 1301 configured to perform this action, within the first communication device 1101.

In some examples, the determining 1201 the number of subsets of time-frequency resources in the set of time-frequency resources may further comprise:

Determining 1201a which communication device of a set of communication devices operating in the communications network 1100 may need downlink data transmission. The first communication device 1101 may be configured to perform this action 1201a, e.g. by means of the determining module 1301 configured to perform this action, within the first communication device 1101.

Determining 1201b the buffer size of the communication device determined to need downlink data transmission, wherein the communication device determined to need downlink data transmission is the second communication device 1102. The first communication device 1101 may be configured to perform this action 1201b, e.g. by means of the determining module 1301 configured to perform this action, within the first communication device 1101.

In some examples, the determining 1202 of the information is based on the determined buffer size and on a channel state information reported by the second communication device 1102.

In some examples, the communications network 1100 may be a TDD communications network, also referred to herein as a TDD wireless communications system.

Encoding 1203 the determined first information and the determined second information into the first part and the second part, respectively of the downlink control channel using identifier information for the second communication device 1102, and performing rate matching prior to sending 1204 the downlink control channel to the second communication device 1102. The first communication device 1101 may be configured to perform this action 1203, e.g. by means of an encoding module 1303 configured to perform this action, within the first communication device 1101. The encoding module 1303 may be the processor 1304 of the first communication device 1101, or an application running on such processor.

In some examples, the first communication device 1101 may not send downlink control channel information in the remaining number of subsets of time-frequency resources in the set of time-frequency resources.

The first communication device 1101 may be configured to perform other actions with other modules 1308 configured to perform these actions within the first communication device 1101. Each of the other modules 1308 may be the processor 1304 of the first communication device 1101, or an application running on such processor.

In some examples all the actions may be performed. In some embodiments, one or more actions may be performed. One or more embodiments may be combined, where applicable. All possible combinations are not described to simplify the description.

The first communication device 1101 may comprise the arrangement depicted in FIG. 13. The detailed description of the arrangement of FIG. 13 corresponds to that provided above in relation to FIG. 8, unless noted above in relation to the determining module 1301, the sending module 1302 and the encoding module 1303, and will thus not be repeated here. Those skilled in the art will also appreciate that determining module 1301, the sending module 1302, the encoding module 1303 and the other modules 1308, described above may refer to a combination of analog and digital modules, as described earlier regarding the modules of FIG. 8.

Figure 14:
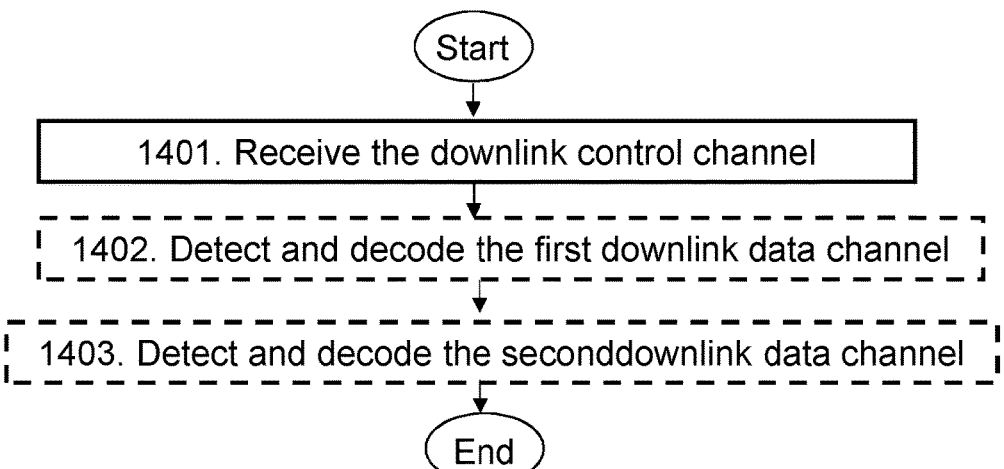
FIG. 14 is a schematic diagram illustrating actions of a method in a second communication device, according to further disclosure.
Figure 15:
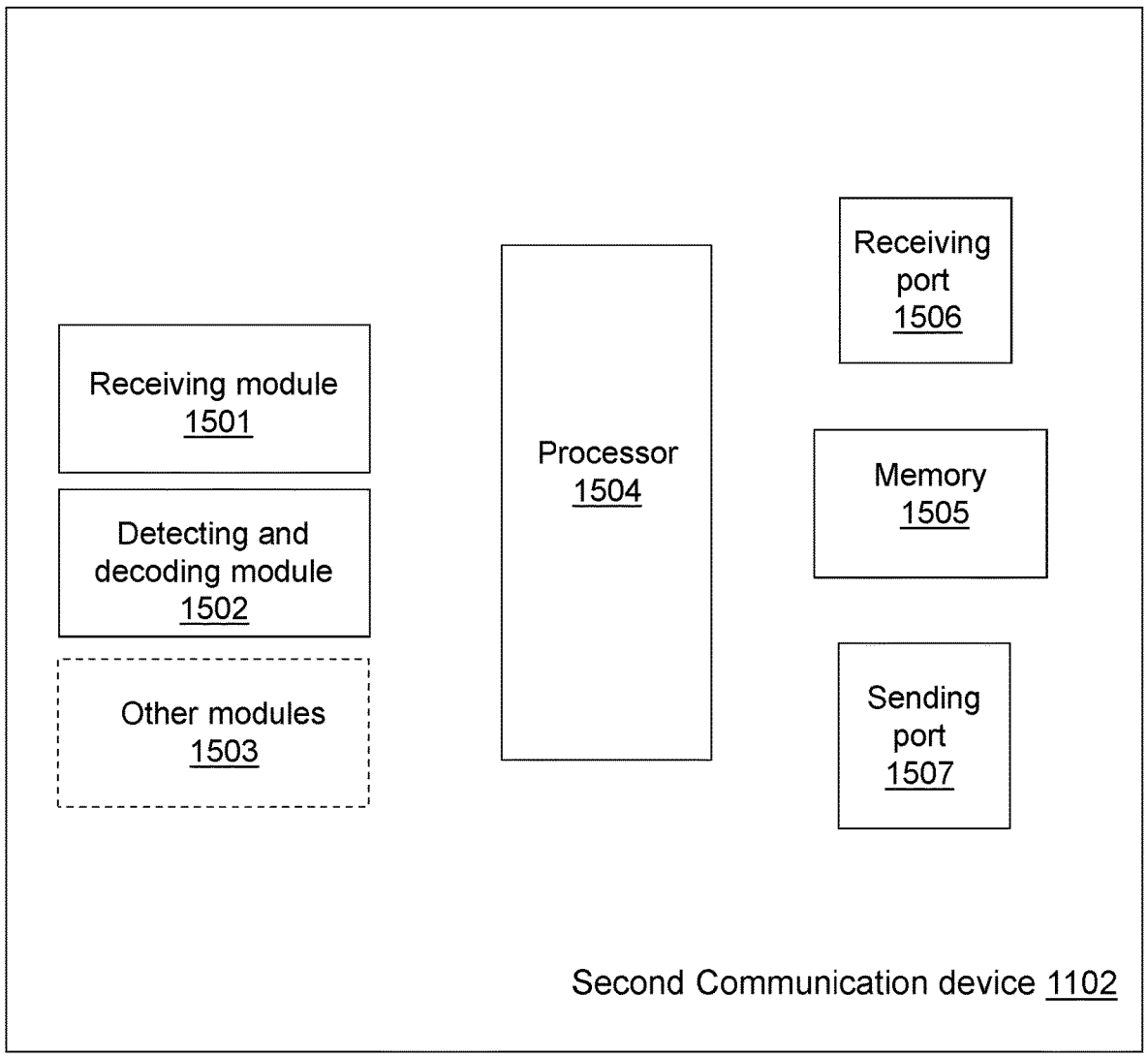
FIG. 15 is a block diagram of a second communication device that is configured according to further disclosure.

The second communication device related embodiments relate to FIG. 14 and FIG. 15. FIG. 12 is a flowchart illustrating an example of a method performed by a second communication device such as the second communication device 1102, e.g., the wireless device 1120. FIG. 15 is a block diagram of a second communication device that is configured according to the further disclosure.

The method performed by the second communication device is for receiving the downlink control channel from the first communication device 1101. The first communication device 1101 and the second communication device 1102 operate in the communications network 1100. The method may comprise one or more of the following actions:

Receiving 1401 a downlink control channel from the first communication device 1101, the downlink control channel comprising a first part and a second part. The first part may comprise a first information, such as one or more first downlink scheduling parameters. The first information may be applicable to a first subset of time-frequency resources, such as a current TTI, in a set of time-frequency resources, such as a frame. The second part may comprise a second information, such as one or more second downlink scheduling parameters, the second information may be valid for a remaining number of subsets of time-frequency resources in the set of time-frequency resources, such as a remaining number of TTI in the frame. The first information may comprise at least some information applicable to the remaining number of subsets of time-frequency resources in the set of time-frequency resources, that is, to the remaining number of TTI in the frame. The second communication device 1102 is configured to perform this action 1401, e.g. by means of a receiving module 1501 configured to perform this action, within the receiving device 1102. The receiving module 1501 may be a processor 1504 of the receiving device 1102, or an application running on such processor.

Detecting and decoding 1402 a first downlink data channel, such as the PDSCH, received from the first communication device 1101 in the first subset of time-frequency resources. The detecting and decoding 1402 may be based on the first information. The receiving device 1102 may be configured to perform this action 1402, e.g. by means of a detecting and decoding module 1502 configured to perform this action, within the receiving device 1102. The detecting and decoding module 1502 may be the processor 1504 of the receiving device 1102, or an application running on such processor.

Detecting and decoding 1403 a second downlink data channel, such as the PDSCH, received from the first communication device 1101 in the remaining number of subsets of time-frequency resources. The detecting and decoding 1402 may be based on the second information. The second communication device 1102 may be configured to perform this action 1403, e.g. by means of the detecting and decoding module 1502 configured to perform this action, within the receiving device 1102.

The second communication device 1102 may be configured to perform other actions with other modules 1503 configured to perform these actions within the second communication device 1102. Each of the other modules 1503 may be the processor 1504 of the second communication device 1102, or an application running on such processor.

In some examples all the actions may be performed. In some embodiments, one or more actions may be performed. One or more embodiments may be combined, where applicable. All possible combinations are not described to simplify the description.

The second communication device 1102 may comprise the arrangement depicted in FIG. 15. The detailed description of the arrangement of FIG. 15 corresponds to that provided above in relation to FIG. 9, unless noted above in relation to the receiving module 1501, the detecting and decoding module 1502 and the other module 1503, and will thus not be repeated here. Those skilled in the art will also appreciate that the receiving module 1501, the detecting and decoding module 1502 and the other module 1503, described above may refer to a combination of analog and digital modules, as described earlier regarding the modules of FIG. 9.

The main examples of the methods just described in relation to the further disclosure are provided below.

General Description of the Further Disclosure

Here an eNB may be used as an illustrative example of the first communication device 1101, and a UE may be used as an illustrative example of the second communication device 1102.

The main motivation behind the proposed methods in the further disclosure is that additional TDD configurations such as TDD configuration 10:0:0 or 9:1:0 may be configured on a secondary carrier, and the number of UEs which may be capable of receiving these configurations may be very low. Moreover, these configurations may be invoked when there may be a heavy downlink data available at the transmitter. Hence, it may be assumed that the probability of scheduling the same UE on successive subframes on these carriers may be very high. Hence for these cases, instead of sending downlink control information on every TTI, the eNode B may send the control information only once in a frame and indicate to the UE how long the downlink control information is valid for.

Figure 16:
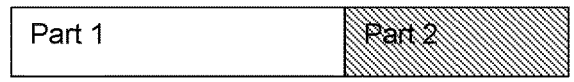
FIG. 16 is a schematic diagram illustrating a proposed downlink control channel structure according to further disclosure.

As shown in FIG. 16, the control channel may consist of two parts, where the first part may be the conventional control channel which is applicable for the current TTI. The information in the part 2 may be used for indicating the remaining TTIs in that frame where the scheduling information indicated in the part 2 may be valid. Note that part 2 may need to have new fields such as modulation, transport block size, number of transmission layers, precoding information valid for the remaining TTIs in the frame. It may need to indicate the number of TTIs in which the downlink scheduling parameters as indicated in the part 2, such as modulation, transport block size, are valid. In addition, it may need to send the HARQ/Redundancy Version (RV) information about the successive transmissions in the frame.

Note that number of transmission layers, precoding information as indicated in the part 1 may be valid for all the remaining TTIs. Hence, there may be no need to indicate them in the part 2.

Figure 17:
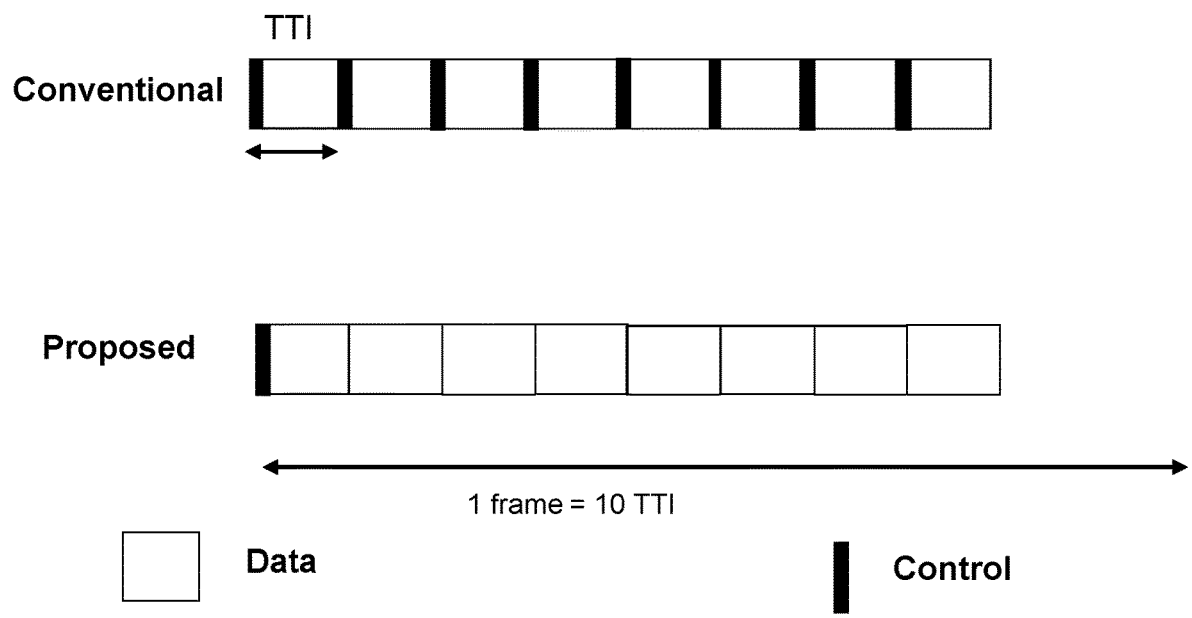
FIG. 17 is a schematic diagram illustrating an example of the proposed frame structure according to further disclosure.

As an example, assuming the 10:0:0 configuration and that the same UE is scheduled in all the TTIs in a frame, the top part of FIG. 17 shows the frame structure using a conventional method of transmitting data in a frame. It may be observed that in every TTI, first 1 (minimum)-3 (maximum) symbols are used for transmitting control information indicating to the UE that data is transmitted to the specific UE in that TTI.

FIG. 17 also shows the proposed method of transmitting control and data in the lower part, wherein in the first TTI, the control information may be sent, which indicates for how many subframes the scheduling parameters may be valid, and the relevant information for the TTIs in which it may be scheduled.

Note that in this case, the control channel which may be sent in the first TTI, may need to be bigger in size, as it may need new fields, such as the number of TTIs the downlink scheduling parameters is valid, in addition to the modulation, transport block size, number of transmission layers, precoding information, HARQ/RV information about the successive transmissions in the frame for part 2, etc . . . .

Figure 18:
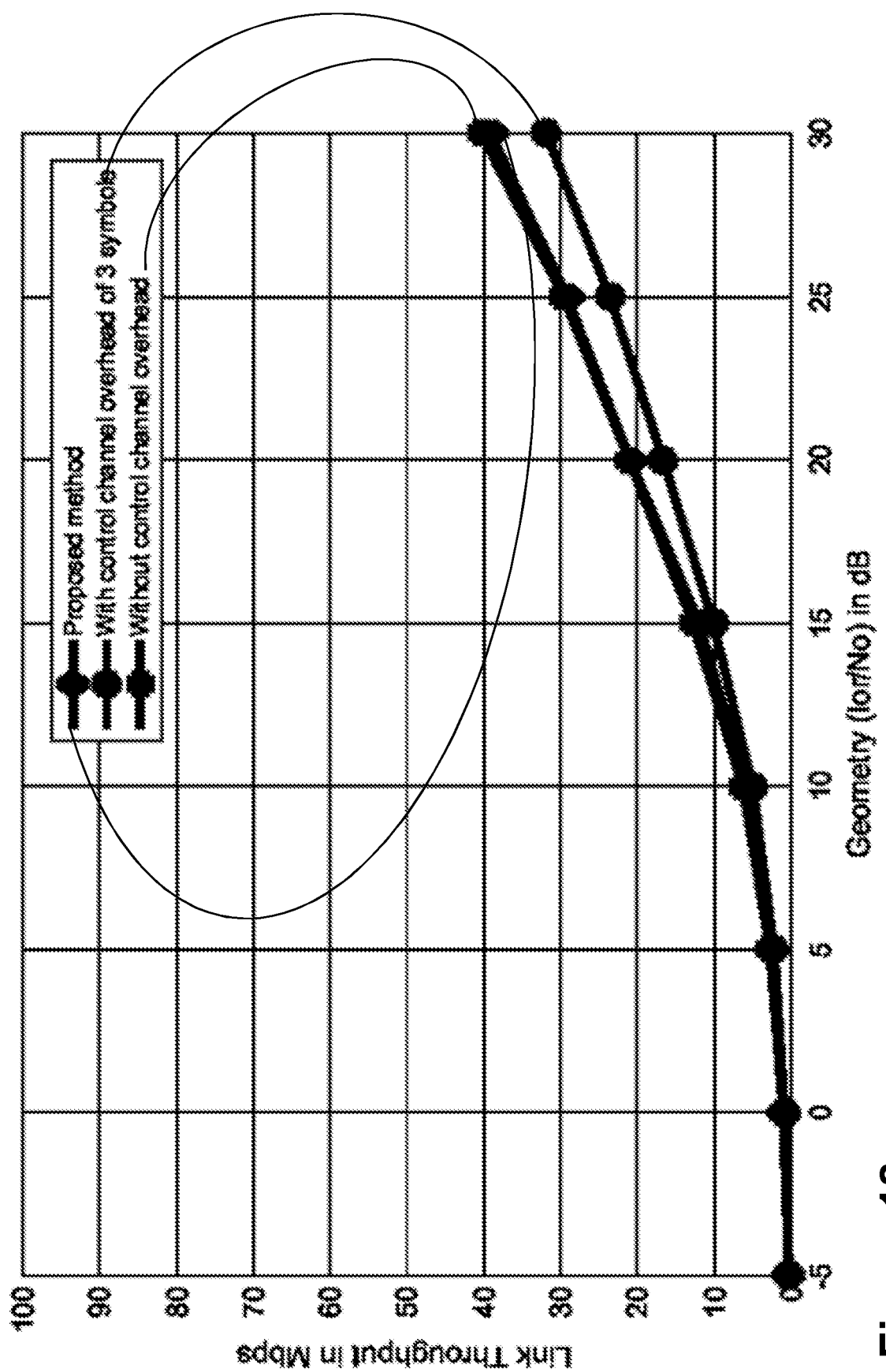
FIG. 18 is a graphical representation illustrating a link throughput comparison with the proposed method according to further disclosure, with the conventional method.

FIG. 18 shows the link throughput performance of an LTE system with the proposed method for control channel transmission, according to a simulation of the further disclosure. In the simulation, the control channel, 3-OFDM symbols, is transmitted only during the first TTI for each frame. For the remaining TTIs in the frame, the control channel symbols, 1-3 OFDM symbols, may be used for PDSCH. That is, all the 14 OFDM symbols are used for PDSCH. It may be observed that the significant performance improvement over the conventional method of using 3 OFDM symbols.

Note that, as an example, it is shown herein that the control channel may be transmitted in the first TTI with the proposed method. However, the method may be equally applicable in any one of the TTIs in the frame. For example, the proposed control channel may be transmitted in the 5th TTI of the frame, where the bits in the part 2 may indicate how many TTIs the part 2 scheduling information may be valid.

In another example of the further disclosure, the control information may be sent on the last TTI of the frame, and the bits in the part 2 may indicate how many TTIs the part 2 scheduling information may be valid in the next frame.

Method at the Network Node 1110 for Transmitting Downlink Control Information on the Component Carrier, as an Example of the Method Performed by the First Communication Device 1101.

For some examples herein, the network node, a scheduler, may need to identify how many TTIs it may schedule the UE consecutively. For this, the network node may determine which UE may need downlink data transmission, and what may be the buffer size available for downlink data transmission for the specific UE. Note that, from the UE feedback, it may get the channel state information as explained in section "Frequency Division Duplex". Based on the CSI and the available buffer, it may estimate the modulation, transport block size, precoding weights, number of transmission layers, HARQ process numbers, RV numbers for the current TTI, as well as for the remaining TTIs. As explained in section "General Description of the further disclosure", some of the parameters such as precoding weights, number of transmission layers may be same for the current TTI and the remaining TTIs. Once it determines the control channel parameters for part 1 and part 2, the network node may encode them in the binary format, channel coded with rate matching and transmitted in the first 1-3 OFDM symbols of the current TTI on the component carrier, i.e. the carrier where the downlink data is transmitted.

Figure 19:
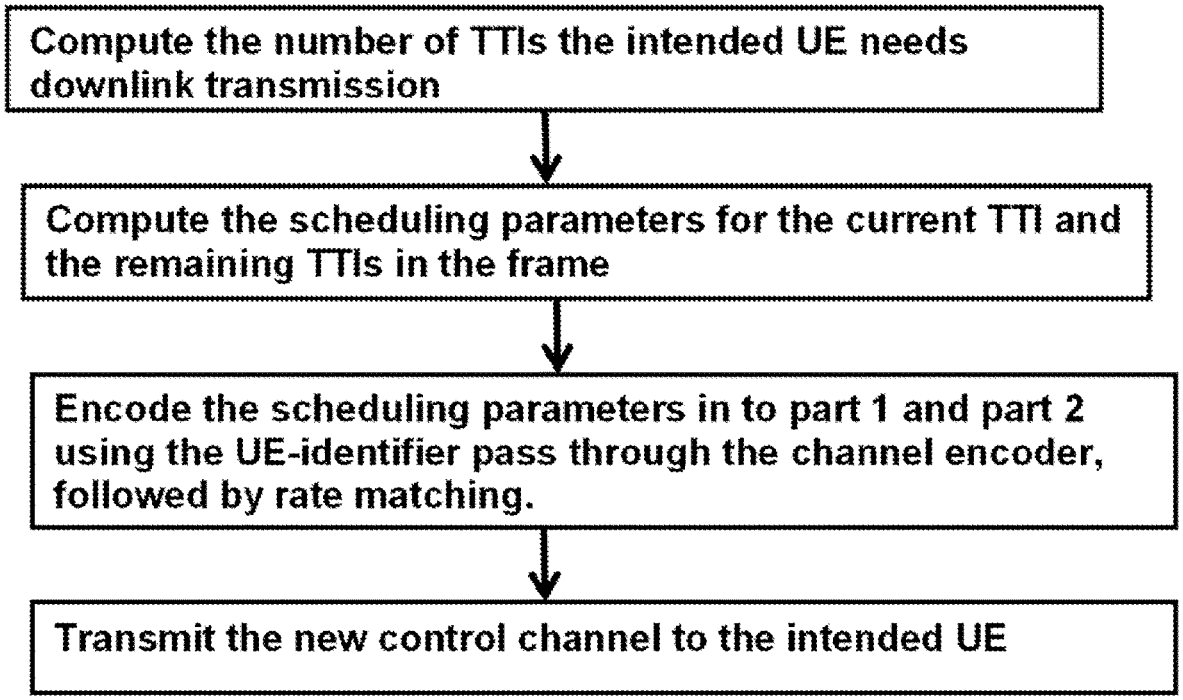
FIG. 19 is a schematic diagram illustrating a non-limiting example of a method in a first communication device, according to further disclosure.

The steps for implementing the proposed method by the first communication device 1101 are shown in a non-limiting example in the flowchart of FIG. 19. The first communication device 1101 may be the network node 1110, with component carrier scheduling.

Method at the UE for Receiving the Downlink Control Information and Decoding the Transmitted Data as an Example of the Method Performed by the Second Communication Device 1102.

The receiving node, the UE, may check the downlink control channel, PCFICH then PDCCH, do a cyclic redundancy check (CRC), and identify that the network schedules the intended UE. Once it decodes the part 1 and part 2 information, it may use the parameters in the part 1 to detect and decode the PDSCH of the current TTI using part 1 information, and detect and decode the PDSCH of the remaining TTIs using part 2 information.

An advantage of the further disclosure herein is a significant improvement in the link throughput due to low overhead of the control channel.

Examples herein of the further disclosure are explained with component carrier scheduling. However it may be equally applicable to cross carrier scheduling, where the scheduling parameters of the secondary carrier may be transmitted using the primary carrier.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention. It is to be understood that the embodiments are not to be limited to the specific examples disclosed, and that modifications and other variants are intended to be included within the scope of this disclosure. Although specific terms may be employed herein, they are used in a generic and descriptive sense only and not for purposes of limitation.

The invention claimed is:

1. A method performed by a first communication device for sending a configuration message to a second communication device, the first communication device and the second communication device operating in a communications network, the method comprising:

determining information related to the configuration message, the information comprising: a) channel information relating to one carrier, b) information relating to a primary carrier and one or more secondary carriers, on which the channel information of the one carrier is to be reported, c) information relating to a reporting time for each of the primary carrier and the one or more secondary carriers, the reporting time being for the second communication device to report the channel information; and sending the configuration message to the second communication device, the configuration message being for configuring the second communication device to report the channel information about the one carrier to the first communication device, the configuration message being for configuring the second communication device to report the channel information about the one carrier alternatively on a primary carrier in a first time period (Tp1) and on one or more secondary carriers in a second time period (Tp2).

2. The method of claim 1, wherein the configuration message comprises one or more of: a) the determined information relating to the one carrier, b) the determined information relating to the primary carrier and the one or more secondary carriers, and c) the determined information relating to the reporting time for each of the primary carrier and the one or more secondary carriers.

3. The method of claim 1, wherein the determined information relating to the reporting time for each of the primary carrier and the one or more secondary carriers comprises one or more of: a) an initial reporting time for the primary carrier and the one or more secondary carriers (T1, T2), b) a periodicity (Tp1, Tp2) of reporting for each one of the primary carrier and the one or more secondary carriers, c) a time difference of reporting between a reporting time for one or more pairs of the primary carrier and the one or more secondary carriers (T2-T1), and d) a periodicity (Tp) of reporting for all of the primary carrier and the one or more secondary carriers.

4. The method of claim 1, wherein the method further comprises:

receiving a first channel information report from the second communication device about the one carrier in the primary carrier, according to the sent configuration message, and receiving a second channel information report from the second communication device for the one carrier in a first secondary carrier of the one or more secondary carriers, according to the sent configuration message.

5. The method of claim 1, wherein the one carrier is a downlink, non-standalone carrier.

6. A method performed by a second communication device for reporting channel information to a first communication device, the first communication device and the second communication device operating in a communications network, the method comprising:

receiving a configuration message from the first communication device, the configuration message being for configuring the second communication device to report channel information about one carrier to the first communication device, the configuration message being for further configuring the second communication device to report the channel information alternatively on a primary carrier and on one or more secondary carriers, the information comprising a) channel information relating to one carrier, b) information relating to a primary carrier and one or more secondary carriers, on which the channel information of the one carrier is to be reported, c) information relating to a reporting time for each of the primary carrier and the one or more secondary carriers, the reporting time being for the second communication device to report the channel information;

determining first channel information to be comprised in the first channel information report, according to the received configuration message;

determining second channel information to be comprised in the second channel information report, according to the received configuration message;

sending a first channel information report to the first communication device for the one carrier on the primary carrier, according to the received configuration message in a first time period (Tp1); and sending a second channel information report to the first communication device for the one carrier on a first secondary carrier of the one or more secondary carriers, according to the received configuration message in a second time period (Tp2).

7. The method of claim 6, wherein the information relating to the reporting time for each of the primary carrier and the one or more secondary carriers comprises one or more of: a) an initial reporting time for the primary carrier and the one or more secondary carriers (T1, T2), b) a periodicity (Tp1, Tp2) of reporting for each one of the primary carrier and the one or more secondary carriers, c) a time difference of reporting between a reporting time for one or more pairs of the primary carrier and the one or more secondary carriers (T2-T1), and d) a periodicity (Tp) of reporting for all of the primary carrier and the one or more secondary carriers.

8. The method of claim 6, wherein the one carrier is a downlink, non-standalone carrier.

9. A first communication device configured to send a configuration message to a second communication device, the first communication device and the second communication device being configured to operate in a communications network, the first communication device comprising:

a processor; and a memory operatively coupled to the processor and comprising program instructions for execution by the processor, whereby the first communication device is configured to:

determine information related to the configuration message, the information comprising: a) channel information relating to one carrier, b) information relating to a primary carrier and one or more secondary carriers, on which the channel information of the one carrier is to be reported, c) information relating to a reporting time for each of the primary carrier and the one or more secondary carriers, the reporting time being for the second communication device to report the channel information; and send the configuration message to the second communication device, the configuration message being configured to configure the second communication device to report the channel information about the one carrier to the first communication device, and the configuration message being configured to configure the second communication device to report the channel information about the one carrier alternatively on a primary carrier in a first time period (Tp1) and on one or more secondary carriers in a second time period (Tp2).

10. The first communication device of claim 9, wherein the configuration message comprises one or more of: a) the determined information relating to the one carrier, b) the determined information relating to the primary carrier and the one or more secondary carriers, and c) the determined information relating to the reporting time for each of the primary carrier and the one or more secondary carriers.

11. The first communication device of claim 9, wherein the determined information relating to the reporting time for each of the primary carrier and the one or more secondary carriers comprises one or more of: a) an initial reporting time for the primary carrier and the one or more secondary carriers (T1, T2), b) a periodicity (Tp1, Tp2) of reporting for each one of the primary carrier and the one or more secondary carriers, c) a time difference of reporting between a reporting time for one or more pairs of the primary carrier and the one or more secondary carriers (T2-T1), and d) a periodicity (Tp) of reporting for all of the primary carrier and the one or more secondary carriers.

12. The first communication device of claim 9, wherein the first communication device is further configured to:

receive a first channel information report from the second communication device about the one carrier in the primary carrier, according to the sent configuration message, and receive a second channel information report from the second communication device for the one carrier in a first secondary carrier of the one or more secondary carriers, according to the sent configuration message.

13. The first communication device of claim 9, wherein the one carrier is a downlink, non-standalone carrier.

14. A second communication device configured to report channel information to a first communication device, the first communication device and the second communication device being configured to operate in a communications network, the second communication device comprising:

a processor; and a memory operatively coupled to the processor and comprising program instructions for execution by the processor, whereby the first communication device is configured to:

receive a configuration message from the first communication device, the configuration message being configured to configure the second communication device to report channel information about one carrier to the first communication device, the configuration message being configured to further configure the second communication device to report the channel information alternatively on a primary carrier and on one or more secondary carriers, the information comprising a) channel information relating to one carrier, b) information relating to a primary carrier and one or more secondary carriers, on which the channel information of the one carrier is to be reported, c) information relating to a reporting time for each of the primary carrier and the one or more secondary carriers, the reporting time being for the second communication device to report the channel information;

determine first channel information to be comprised in the first channel information report, according to the received configuration message;

determine second channel information to be comprised in the second channel information report, according to the received configuration message;

send a first channel information report to the first communication device for the one carrier on the primary carrier, according to the received configuration message in a first time period (Tp1); and send a second channel information report to the first communication device for the one carrier on a first secondary carrier of the one or more secondary carriers, according to the received configuration message in a second time period (Tp2).

15. The second communication device of claim 14, wherein the information relating to the reporting time for each of the primary carrier and the one or more secondary carriers comprises one or more of: a) an initial reporting time for the primary carrier and the one or more secondary carriers (T1, T2), b) a periodicity (Tp1, Tp2) of reporting for each one of the primary carrier and the one or more secondary carriers, c) a time difference of reporting between a reporting time for one or more pairs of the primary carrier and the one or more secondary carriers (T2-T1), and d) a periodicity (Tp) of reporting for all of the primary carrier and the one or more secondary carriers.

16. The second communication device of claim 14, wherein the one carrier is a downlink, non-standalone carrier.

* * * * *

UNITED STATES PATENT AND TRADEMARK OFFICE
CERTIFICATE OF CORRECTION

PATENT NO. : 10,594,433 B2  
APPLICATION NO. : 15/579511  
DATED : March 17, 2020  
INVENTOR(S) : Nammi et al.

Page 1 of 1

It is certified that error appears in the above-identified patent and that said Letters Patent is hereby corrected as shown below:

On the Title Page

Item (72) Inventors: Sairamesh Nammi, Austin, TX (US); Dominque Everaere, Åkersberga (SE); Christian Hoymann, Aachen (DE) should read -- (72) Inventors: Sairamesh Nammi, Austin, TX (US); Dominique Everaere, Åkersberga (SE); Christian Hoymann, Aachen (DE) --

Signed and Sealed this  
Twenty-fifth Day of August, 2020

Andrei Iancu  
*Director of the United States Patent and Trademark Office*